US010694101B2

(12) United States Patent
Olsson et al.

(10) Patent No.: US 10,694,101 B2
(45) Date of Patent: Jun. 23, 2020

(54) CONTRAST-ENHANCED COMBINED IMAGE GENERATION SYSTEMS AND METHODS

(71) Applicant: FLIR Systems AB, Täby (SE)

(72) Inventors: Stefan Olsson, Stockholm (SE); Christian Högstedt, Nacka (SE); Katrin Strandemar, Rimbo (SE)

(73) Assignee: FLIR Systems AB, Taby (SE)

( * ) Notice: Subject to any disclaimer, the term of this patent is extended or adjusted under 35 U.S.C. 154(b) by 263 days.

(21) Appl. No.: 15/842,554

(22) Filed: Dec. 14, 2017

(65) Prior Publication Data
US 2018/0115705 A1 Apr. 26, 2018

Related U.S. Application Data

(63) Continuation of application No. PCT/US2016/037698, filed on Jun. 15, 2016.
(Continued)

(51) Int. Cl.
*H04N 5/232* (2006.01)
*G06T 5/50* (2006.01)
(Continued)

(52) U.S. Cl.
CPC ......... *H04N 5/23232* (2013.01); *G06T 5/002* (2013.01); *G06T 5/009* (2013.01);
(Continued)

(58) Field of Classification Search
CPC . G06T 2207/20221; G06T 2207/10048; G06T 5/009; G06T 2207/20208;
(Continued)

(56) References Cited

U.S. PATENT DOCUMENTS 8,520,970 B2    8/2013   Strandemar
8,853,631 B2   10/2014   Strandemar
(Continued)

FOREIGN PATENT DOCUMENTS

KR    20130054281    5/2013
WO    WO 2014/012946   1/2014
WO    WO 2014/105993   7/2014

OTHER PUBLICATIONS

Gangkofner et al. "Optimizing the High-Pass Filter Addition Technique for Image Fusion", Photogrammetric Engineering & Remote Sensing, Sep. 2008, vol. 74, No. 9, American Society for Photogrammetry and Remote Sensing, pp. 1107-1118.

*Primary Examiner* — Geoffrey E Summers
(74) *Attorney, Agent, or Firm* — Haynes and Boone, LLP

(57) ABSTRACT

Various techniques are disclosed to generate a contrast-enhanced combined image based on a thermal image and high spatial frequency content extracted from a visual light image, said images depicting the same scene. In one example, a method comprises: determining a blending measure indicating the quality of at least one of said images; combining luminance components of pixel values comprised in the thermal image and of pixel values representing high spatial frequency content comprised in the visual light image based on the blending measure; and generating a contrast-enhanced combined image based on the thermal image and the combined luminance components.

20 Claims, 8 Drawing Sheets

Related U.S. Application Data

(60) Provisional application No. 62/180,006, filed on Jun. 15, 2015.

(51) Int. Cl.
  *G06T 5/00* (2006.01)
  *G06T 5/20* (2006.01)
  *H04N 5/235* (2006.01)
  *H04N 5/33* (2006.01)

(52) U.S. Cl.
  CPC ............. *G06T 5/20* (2013.01); *G06T 5/50* (2013.01); *H04N 5/2355* (2013.01); *H04N 5/332* (2013.01); *G06T 2207/10004* (2013.01); *G06T 2207/10024* (2013.01); *G06T 2207/10048* (2013.01); *G06T 2207/20192* (2013.01); *G06T 2207/20208* (2013.01); *G06T 2207/20221* (2013.01)

(58) Field of Classification Search
  CPC .. G06T 5/20; G06T 5/002; G06T 5/50; G06T 2207/20192; G06T 2207/10024; G06T 2207/10004; H04N 5/2355; H04N 5/332; H04N 5/33; H04N 5/23232
  USPC .................................................. 382/266, 275
  See application file for complete search history.

(56) References Cited

U.S. PATENT DOCUMENTS

| | | | | |
|---|---|---|---|---|
| 2005/0110621 | A1* | 5/2005 | Hahn | B60R 1/00 340/435 |
| 2008/0024608 | A1* | 1/2008 | Hahn | B60R 1/00 348/148 |
| 2008/0099678 | A1* | 5/2008 | Johnson | G01J 5/02 250/332 |
| 2011/0262053 | A1* | 10/2011 | Strandemar | G06K 9/6289 382/263 |
| 2012/0218418 | A1* | 8/2012 | Strandemar | G01J 5/02 348/164 |
| 2014/0321739 | A1 | 10/2014 | Yang | |
| 2016/0093034 | A1* | 3/2016 | Beck | G06T 5/50 345/617 |

\* cited by examiner

CONTRAST-ENHANCED COMBINED IMAGE GENERATION SYSTEMS AND METHODS

CROSS-REFERENCE TO RELATED APPLICATIONS

This application is a continuation of International Patent Application No. PCT/US2016/037698 filed Jun. 15, 2016 and entitled "CONTRAST-ENHANCED COMBINED IMAGE GENERATION SYSTEMS AND METHODS," which is incorporated herein by reference in its entirety.

International Patent Application No. PCT/US2016/037698 filed Jun. 15, 2016 claims priority to and the benefit of U.S. Provisional Patent Application No. 62/180,006 filed on Jun. 15, 2015 and entitled "CONTRAST-ENHANCED COMBINED IMAGE GENERATION SYSTEMS AND METHODS," which is incorporated herein by reference in its entirety.

TECHNICAL FIELD

The present disclosure relates generally to image processing and enhancement techniques, and in particular, to methods, apparatuses, and computer program software for generating a contrast-enhanced combined image based on a thermal image and a visual light (VL) image.

BACKGROUND

Within the area of image processing thermal images, also called IR images, these images suffer from multiple deficiencies and are usually noisy, have a low resolution, have low contrast, and have low brightness, which makes it difficult to identify objects in the image, thus requiring preprocessing to improve their quality. A thermal image depicting a scene can be contrast-enhanced by combining the thermal image with a High Spatial Frequency Content (HSFC) image obtained from image information from a visual (or visible) light (VL) image, said combination being known as contrast-enhanced fusion or blending. A number of technical problems may arise when attempting to accomplish such combination and contrast enhancement.

A thermal imaging device, such as an IR camera, may be provided together with a VL camera to capture a visual light image and a thermal image and to process these images so that they can be displayed together as a contrast-enhanced image. The combination is advantageous in identifying variations in temperature in an object using IR data or thermal data from the thermal image while at the same time displaying a sufficient amount of data from the visual light image to simplify orientation and recognition of objects in the resulting image to a user using the camera. This may be achieved, for example, by enhancing the luminance component of IR image data values/pixel values with luminance components representing edges in the visual light image.

A High Spatial Frequency Content (HSFC) image typically comprises edges and corners derived from visual light image information, e.g. by high pass filtering the visual light image. The HSFC image and IR image are then combined by combining luminance information or luminance components of each pixel of the aligned HSFC image and each pixel of the aligned IR image into a contrast-enhanced combined image, thereby improving the low contrast in the thermal image. A method and apparatus for combining a thermal image and a HSFC image is disclosed in U.S. Pat. No. 8,520,970 B2 issued Aug. 27, 2013 and assigned to FLIR Systems AB, which is hereby incorporated by reference in its entirety.

A possible problem when applying such a technique is a parallax error between the thermal and visual light imaging systems. The capturing of the thermal image and the visual light image is performed by separate thermal and visual light imaging systems of the camera. The optical axes of the respective imaging systems may for example be configured with an offset from each other and configured with a relative angle between the optical axes. Thus, an optical phenomenon known as parallax error will arise that is more predominant when capturing images of a scene at a close range, e.g. less than 10 m between the depicted object and the thermal imaging device. To eliminate or reduce the parallax error, the images must be aligned. A large parallax error may result in ghosting or a ghost contrast-enhanced combined image, where the High Spatial Frequency Content (HSFC) image is offset in relation to the thermal image and is combined, e.g. super-imposed on top of the thermal image.

In some conventional image alignment techniques, the images are aligned based on a focusing distance derived from a position of a focusing arrangement, such as a focus motor, configured for determining a distance to an object being captured by the imaging parts. However, if such an alignment technology is not used and/or under certain circumstances there may be a remaining parallax error that causes the mentioned ghosting phenomena.

Yet another problem may occur when the imaged scene does not comprise any edges or corners, and the contrast-enhanced combined image therefore is not improved. That is, in this case the HSFC image then primarily comprises noise and thus the contrast of the combined image is not improved. On the contrary, image quality and interpretability of a combined image being processed in this manner for enhancing contrast may even be reduced.

Yet another problem is that some parts of the scene comprise edges or corners while other parts of the scene lack edges or corners, thereby causing reduced image quality and interpretability of the contrast-enhanced combined image in a part or a subset of the image.

Yet another problem may occur when an imaging system, e.g. the thermal imaging system, is out-of focus. This may be the case when a focusing distance range, i.e. a minimum acceptable focusing distance to the maximum acceptable focusing distance, of the imaging systems does not overlap with the distance to the scene. This will result in an increased parallax error or offset in the image alignment processing, resulting in a deviation between pixels representing the same object in the HSFC image and the thermal image. This may in its turn cause ghosting or a ghost image, where the HSFC image is offset in relation to the thermal image and is combined, for example super-imposed on top of the thermal image.

Yet another problem may occur in cases when some parts of the scene are within the imaging system focusing range while other parts of the scene are not, thereby causing ghosting in a part or subset of the image.

Yet another problem may occur when there is too little or too much light present for obtaining a good quality visual light image. When it is too dark, the visual light image may contain more noise than information. When it is too bright, the visual light image may contain too little contour/edge information.

Thus, there exists a need for an improved way of providing a contrast-enhanced combined image comprising data from a thermal image and data from a High Spatial Frequency Content (HSFC) image.

SUMMARY

The present disclosure comprises embodiments that solve or at least reduce the problems described above. Embodiments of the disclosure comprise thermal image processing wherein information from a thermal image is combined with luminance information from a high spatial frequency content (HSFC) extracted from a visual light image to yield an improved contrast-enhanced combined image based at least on a blending measure indicating a quality of at least one of said images. The contribution of the luminance information from the visual light image is based on the blending measure.

As a result, a combined image is generated in an improved manner alleviating effects of focus settings of the IR imaging system or being adapted to the depicted scene such as varying distances to objects in the depicted scene or absence of corner or edges in the depicted scene. A high Spatial Frequency Content (HSFC) image being extracted from the visual image and used in the generation of a combined contrast-enhanced thermal image is hereinafter also called an HSFC image.

Embodiments of the disclosure include a method of generating a contrast-enhanced combined image based on a thermal image and high spatial frequency content extracted from a visual light image, said images depicting the same scene, the method comprising: receiving a thermal image and a visual light image of a scene; determining a blending measure indicating the quality of at least one of said thermal and visual light images; combining, based on the blending measure, luminance components of thermal image pixels from the thermal image with luminance components of visual light image pixels representing high spatial frequency content extracted from the visual light image; and generating a contrast-enhanced combined image based on the thermal image and the combined luminance components.

In embodiments, the quality of an image is high when said image is focused and/or said image comprises edges; and wherein the quality of an image is low when said image is unfocused and/or said image lack edges.

In embodiments, the quality of the visual light image is determined based on the contrast variation in the visual light image. When there is too little light present, the whole image will be very dark, and the contour/edge information will be covered in noise. When there is too much light present, the whole image will be too bright to provide useful contour/edge information. In both cases, the contrast variation will be low.

Further embodiments comprises: determining luminance weights for said thermal image and for said visual light image based on the blending measure; and scaling the luminance components from the thermal image and the luminance components from the visual light, respectively with said corresponding luminance weights. In yet further embodiments, the luminance weights may be determined to scale the luminance components such that the contribution of luminance components representing high spatial frequency content of the visual light image is proportional to the blending measure.

One or more embodiments further comprises a selection of one or more of the following:

The blending measure is determined based on an estimated distance to a scene captured by said images;

The blending measure is determined based on a focusing distance of a thermal imaging system capturing the thermal image and/or of a visual light system capturing the visual light image;

The blending measure is determined based on at least one of: an estimated distance to the scene from a thermal imaging system capturing the thermal image and/or a visual imaging system capturing the visual light image; and a focusing distance of the thermal imaging system and/or of the visual light system.

The blending measure is determined based on an image sharpness relation dependent on a distance to the scene or to an object in the scene from a thermal imaging system and/or a visual imaging system of a thermal imaging device capturing said images;

The blending measure is based on a parallax error relation dependent on a distance to the scene from a thermal imaging system and/or a visual imaging system of a thermal imaging device capturing said images; and/or The blending measure is determined based on an edge measure indicating the presence of edges in the captured images of the scene and being dependent on the high spatial frequency content comprised in the visual light image.

The blending measure is determined based on the contrast variation in the visual light image.

One or more embodiments further comprise blurring the high spatial frequency content representation in the combined image in response to the blending measure indicating that the thermal image is unfocused.

One or more embodiments further comprise: dividing said thermal image into thermal image segments; dividing said visual light image into visual light image segments; and determining respective blending measures for said thermal and visual light image segments, wherein the combining of the luminance components comprises combining luminance components of pixels from the respective thermal image segments with luminance components of pixels representing high spatial frequency content from the corresponding visual light image segments based on the corresponding blending measures, and wherein the generating of the contrast-enhanced combined image comprises: generating contrast-enhanced combined image segments based on the thermal image segments and the combined luminance components, and generating the contrast-enhanced combined image comprising said contrast-enhanced combined image segments.

One or more embodiments further comprise excluding the luminance components of pixels representing the high spatial frequency content of the visual light image dependent on the blending measure indicating that a thermal imaging system producing the thermal image is unfocused.

One or more embodiments further comprise excluding the luminance components of pixels representing the high spatial frequency content of the visual light image dependent on the blending measure indicating that there is not enough contrast variation in the visual light image. The contrast variation may e.g. be compared with a predetermined threshold, and if the contrast variation is lower than the predetermined threshold, the blending measure will indicate that there is not enough contrast variation in the visual light image.

Embodiments of the disclosure comprise a thermal imaging apparatus for generating a contrast-enhanced combined image based on a thermal image and high spatial frequency content extracted from a visual light image, said images depicting the same scene. The thermal imaging apparatus of embodiments comprises: a thermal imaging system configured to capture a thermal image of a scene; a visual light imaging system configured to capture a visual light image of the scene; and a processor communicatively coupled to the thermal and visual light imaging systems, wherein the processor is configured to: determine a blending measure indicating the quality of at least one of said thermal and visual light images; combine, based on the blending measure, luminance components of thermal image pixels from the thermal image with luminance components of visual light image pixels representing high spatial frequency content extracted from the visual light image, and generate a contrast-enhanced combined image based on the thermal image and the combined luminance components.

In embodiments of the thermal imaging apparatus, the quality of an image is high when said image is focused and/or said image comprises edges, and wherein the quality of an image is low when said image is unfocused and/or said image lack edges.

In embodiments, the quality of the visual light image is determined to be low when there is not enough contrast variation in the visual light image.

In further embodiments of the thermal imaging apparatus, the processor is further configured to: determine luminance weights for said thermal image and for said visual light image based on the blending measure; and scale the luminance components from the thermal image and the luminance components from the visual light, respectively with said corresponding luminance weights. In yet further embodiments, the luminance weights are determined to scale the luminance components such that the contribution of luminance components representing high spatial frequency content of the visual light image is proportional to the blending measure.

One or more embodiments of the thermal imaging apparatus comprises a selection of one or more of the following:
  The blending measure is determined based on an estimated distance to the scene captured by said images;
  The blending measure is determined based on a focusing distance of the thermal imaging system and/or of the visual light system;
  The blending measure is determined based on at least one of: an estimated distance to the scene from the thermal imaging system capturing the thermal image and/or the visual imaging system; and a focusing distance of the thermal imaging system and/or of the visual light system;
  The blending measure is determined based on an image sharpness relation dependent on a distance to the scene or to an object in the scene from the thermal imaging system and/or the visual imaging system.
  The blending measure is based on a parallax error relation dependent on a distance to the scene from the thermal imaging system and/or the visual imaging system.
  The blending measure is determined based on an edge measure indicating the presence of edges in the captured images of the scene and being dependent on the high spatial frequency content comprised in the visual light image.
  The blending measure is determined based on the contrast variation in the visual light image.

In one or more embodiments of the thermal imaging apparatus, the processor is further configured to blur the high spatial frequency content represented in the contrast-enhanced combined image in response to the blending measure indicating that the thermal image is unfocused.

In one or more embodiments of the thermal imaging apparatus, wherein the processor is further configured to: divide said thermal image into thermal image segments; divide said visual light image into visual light image segments; determine respective blending measures for said thermal and visual light image segments; combine the luminance components of the thermal image pixels and the visual light image pixels by combining luminance components of pixels from the respective thermal image segments with luminance components of pixels representing high spatial frequency content from the corresponding visual light image segments based on the corresponding blending measures; and generate the contrast-enhanced combined image by: generating contrast-enhanced combined image segments based on the thermal image segments and the combined luminance components, and generating the contrast-enhanced combined image comprising said contrast-enhanced combined image segments.

In one or more embodiments of the thermal imaging apparatus, wherein the processor is further configured to exclude the luminance components of pixels representing the high spatial frequency content of the visual light image dependent on the blending measure indicating that the thermal imaging system producing the thermal image is unfocused.

One or more embodiments further comprise excluding the luminance components of pixels representing the high spatial frequency content of the visual light image dependent on the blending measure indicating that there is not enough contrast variation in the visual light image.

According to further embodiments of a thermal imaging apparatus the processor is further configured to perform any of the method steps of the disclosure.

Further embodiments comprise non-transitory machine-readable medium on which is stored machine-readable code which, when executed by a processor of a thermal imaging apparatus, control the processor to perform the steps of any of the method steps of the disclosure. Further embodiments comprise a computer program product having computer program code portions configured to control a processor to perform any of the method steps of the disclosure.

Further embodiments and examples of the disclosure are described in conjunction with the accompanying drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Introduction

Figure 1:
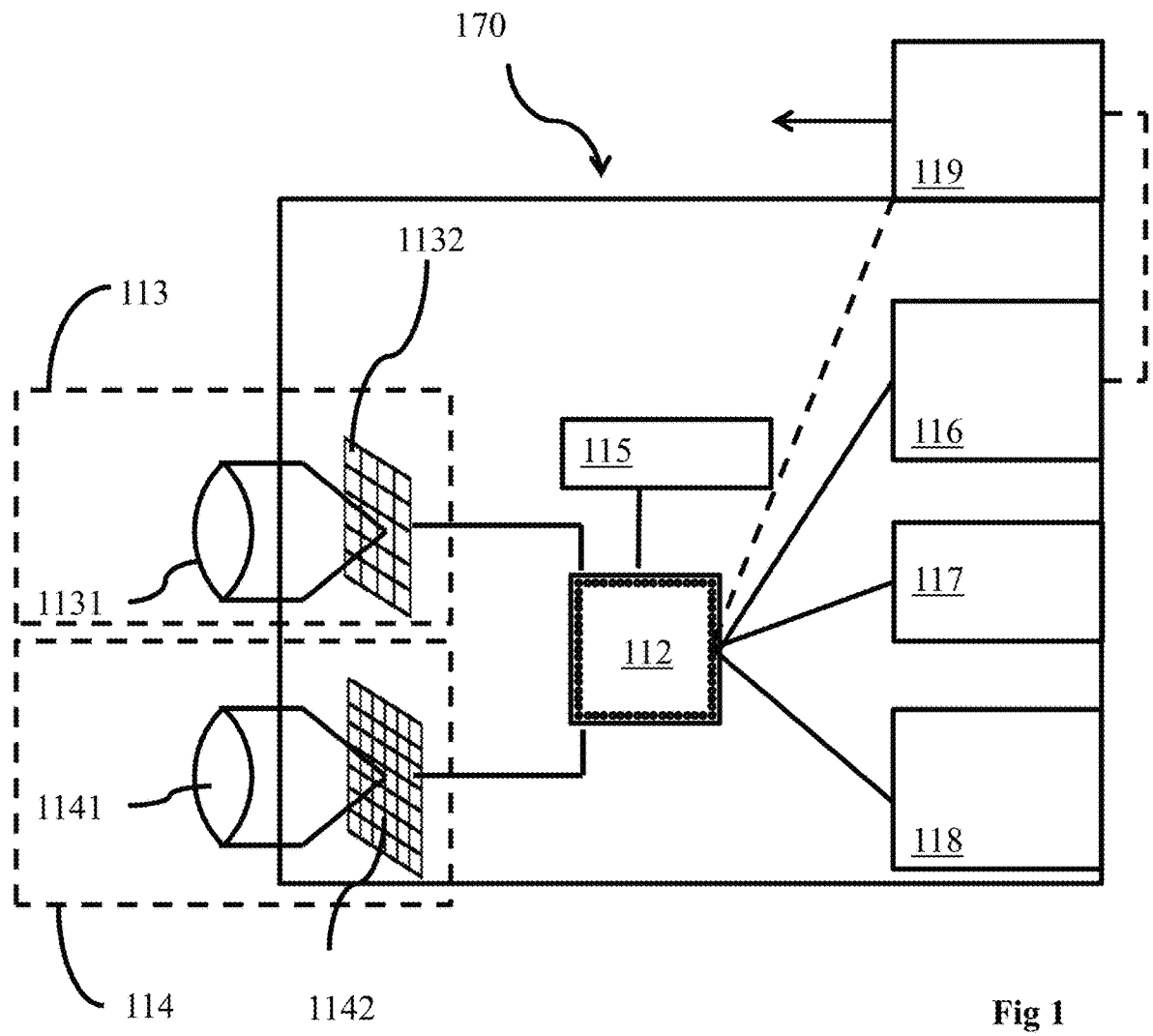
FIG. 1 shows a schematic view of a thermal imaging device in accordance with one or more embodiments of the disclosure.

Embodiments of the present disclosure provide methods, apparatus and computer program products configured to generate thermal images in the form of contrast-enhanced combined images. In a contrast-enhanced combined image, contrasts from a visual (or visible) light (VL) image depicting a scene are derived or extracted as a High Spatial Frequency Content (HSFC) image which is combined with a thermal (IR) image depicting the same scene and showing temperature variations. Thus, the advantages of the two image types are combined improving clarity and interpretability of the resulting combined image. This adds contours and contrasts to the thermal image but does not otherwise alter the thermal representation of the depicted scene. As a result, the borders and edges of objects captured by the images can clearly be seen in the combined image, while at the same time maintaining the unaltered radiometry data value, image data value or pixel value associated to each pixel in the thermal image. In one example, image data values or pixel values associated with each pixel in a thermal image comprise luminance components and chrominance (color) components of a color space or color model, often called a palette.

In one example, to preserve the palette of the thermal image, only the luminance component of the HSFC image may be added to the thermal image. As a result, the colors are not altered and the color properties of the original thermal image are maintained, while at the same time adding the desired contrasts. When combining the luminance component of the visible image with the luminance component of the thermal image, luminance weights α1 and α2 of the respective thermal and visual light images may be used to determine the balance between the two images in accordance with one or more embodiments. These factors may be determined by a thermal imaging device, such as an IR camera, based on various parameters.

As mentioned above, since the capturing of the thermal image and the visual image may be performed by different imaging systems of the thermal imaging device, the optical axes of the IR (thermal) imaging systems and VL (visual light) imaging system may be configured with an offset from each other, configured with a relative angle between the optical axes and relatively rotated around the optical axis. Thus, an optical phenomenon known as parallax will arise that is more predominant when objects being imaged are close, e.g. less than 10 m, to the thermal imaging device. To eliminate this parallax error, i.e. displacement between objects in a captured IR image and a captured visual light image, the images must be aligned. During production of a thermal imaging device the displacement or offset of the same object captured by an IR imaging system in a thermal image and a VL imaging system on a visual light image may be determined as a parallax relation for different distances from the thermal imaging device to an object in the captured scene. In one example, the parallax relation is determined as value triplets $(x_{offset}, y_{offset}, z)$ of IR/VL pixel offsets/displacements and distance from the thermal imaging device to an object in the captured scene when the IR imaging system and the VL imaging system are set to the same focusing distance. In another example, the parallax relation is determined as value quadruplets $(x_{offset}, y_{offset}, \theta, z)$ of IR/VL pixel x-axis/y-axis offsets/displacements, relative rotation and distance from the thermal imaging device to an object in the captured scene when the IR imaging system and the VL imaging system are set to the same focusing distance. The parallax relation and the relation between the distance from the thermal imaging device to an object in the captured scene and the focusing distance may be determined according to suitable techniques, such as for example those described in U.S. Pat. No. 8,853,631 issued Oct. 7, 2014 and assigned to FLIR Systems AB, which is hereby incorporated by reference in its entirety.

In some situations the IR imaging system focusing distance might be set in a way such that it does not correspond to the distance from the thermal imaging device to the objects or a subset of the objects in the scene captured by the thermal imaging system. If this focusing distance is applied, either directly or converted to the distance from the thermal imaging device to the objects or a subset of the objects in the scene, in the parallax relation, this will result in an increased error, displacement or offset in the image alignment processing, resulting in excessive deviation between pixels representing the same object in the VL/HSFC image and the thermal image, thereby causing ghosting or a ghost image, i.e. the HSFC image is offset in relation to the thermal image.

In embodiments of the disclosure, this is solved by obtaining a thermal image and an HSFC image extracted from a visual light image depicting the same scene and preferably being aligned using the parallax relation, by determining a blending measure indicating a quality of at least one of said images and by generating a combined image based on the blending measure. A blending measure of the thermal image is determined, e.g. such that it indicates that the IR imaging system is focused if the set IR focusing distance obtained from the IR imaging system is within an IR focusing distance range thereby generating images having a high quality, or indicates that the IR imaging system is out-of-focus if the IR focusing distance is outside an IR focusing distance range thereby generating images having a low quality. Luminance weights $\alpha_1$ and $\alpha_2$ are then determined based on the blending measure of the thermal image, e.g. such that $\alpha_1=1$ and $\alpha_2=0$ if the IR imaging system is out-of-focus or $\alpha_1=0.5$ and $\alpha_2=0.5$ if the IR imaging system is in focus. A contrast-enhanced combined image is generated by image processing luminance components of pixel values comprised in the HSFC image and/or the thermal image based on the blending measure $B_m$ and combining the luminance component of pixel values from the thermal image scaled with $\alpha_1$ and the luminance component of corresponding pixels from the HSFC image scaled with $\alpha_2$. In one or more embodiments, corresponding pixels in the respective thermal image and visual light image are pixels with the same pixel coordinates or the same transformed pixel coordinates transformed by a parallax transform relation.

System Overview

FIG. 1 shows a schematic view of one or more embodiments of a thermal imaging device 170, e.g. in the form of a thermography arrangement or an infrared IR camera. In embodiments, the thermal imaging device 170 comprises an infrared (IR) imaging system 113 that is configured to capture infrared (IR) images, i.e. thermal images, in the form of IR image data values/pixel values, representing infrared radiation emitted from a scene. The infrared (IR) imaging system 113 is further communicatively coupled to a processor 112. In embodiments the infrared (IR) imaging system 113 is arranged to receive control data and in response to said control data to trigger the capturing of an infrared image of a scene. In embodiments the infrared (IR) imaging system 113 is arranged to send a signal frame of IR image data values as a captured IR image to the processor 112.

In embodiments, the processor/processing unit 112 is provided with specifically designed programming or program code portions adapted to control the processing unit to perform the steps and functions of embodiments of the disclosure. In embodiments, he thermal imaging device 170 further comprises a memory 115 configured to store program code portions, data values or parameters received from the processor 112 or to retrieve program code portions, data values or parameters to the processor 112. In embodiments, the thermal imaging device 170 further comprises a communications interface 116 configured to send or receive data values or parameters to/from a processor 112 to/from external or internal units or sensors, such as one or more distance measuring devices 119, via the communications interface 116. In one or more embodiments the thermal imaging device 170 further comprises an input device 117, configured to receive input or indications from a user, e.g. a user to indicate generation of a contrast-enhanced combined image. In one or more embodiments the thermal imaging device 170 further comprises a display 118 configured to receive a signal from a processor 112 and to display the received signal as a displayed image, e.g. to display a visible representation of a contrast-enhanced combined image to a user of the thermal imaging device 170. In one embodiment the display 118 is integrated with a user input device 117 configured to receive a signal from a processor 112 and to display the received signal as a displayed image and receive input or indications from a user, e.g. by applying touch screen functionality and to send a user input signal to said processor/processing unit 112.

In one or more embodiments the thermal imaging device 170 further comprises one or more distance measuring devices 119 configured to measure the distance from the thermal imaging device to the objects or a subset of the objects in the scene captured by the IR imaging system 113 of the thermal imaging device 170 a distance data value and provide the distance data value to the processor 112. In embodiments, the distance measuring device 119 is communicatively coupled to the processor 112 directly or via the communications interface 116. In embodiments, the processor 112 is communicatively coupled to said infrared (IR) imaging system 113, said memory 115, said communications interface 116 and optionally communicatively coupled to said user input device 117, said display 118, said distance measuring device/s 119.

In embodiments, the thermal imaging device 170 further optionally comprises a VL imaging system 114 that is configured to capture visual light (VL) images in the form of visual light (VL) image data values/pixel values, representing electromagnetic radiation emitted from an observed scene within wavelength bands excluding, complementary to or overlapping with IR or thermal wavelength bands. The VL imaging system 114 is further communicatively coupled to the processor 112. In embodiments the VL imaging system 114 is further arranged to receive control data and in response to said control data to trigger the capturing of a visual light image of a scene. In embodiments, the VL imaging system 114 is further arranged to send a signal frame of visual light image data values as a visual light image to the processor 112. The IR imaging system 113 comprises an optical system 1131 configured for transmission of thermal wavelength radiation to an infrared (IR) detector 1132, for example comprising a micro-bolometer focal plane array. The VL imaging system 114 comprises an optical system 1141 configured for transmission of visual light wavelength radiation to a focal plane array, or VL detector 1142, for example comprising a charge-coupled device (CCD). The respective optical system comprises a lens, possible zoom functionality and focus functionality.

In one or more embodiments, an Infrared (IR) image includes a frame of IR image data values that represent infrared radiation emitted or reflected from a scene. In yet an example, a visual light image includes a frame of visual light image data values that represent non-infrared electromagnetic radiation emitted or reflected from a scene. In one example, image data values or pixel values are represented in an instance of a data structure, such as an image data frame. In one example, a depicted scene includes a part of the observable world, e.g. part of an industrial complex being inspected with a thermal imaging device.

In embodiments, the one or more distance measuring devices may for example comprise a selection of the following: a distance sensor, a laser range finder, a time of flight sensor, and/or an ultra-sonic distance measuring device.

In one or more embodiments, the VL imaging system 114 may be adapted to capture electromagnetic radiation in other non-thermal wavelengths in addition to or in place of visual light wavelengths. For example, the VL imaging system 114 may be configured to capture near infrared (NIR) light, short wave infrared (SWIR) light, ultra-violet (UV) light, or other non-thermal light in addition to or in place of visual light. The VL imaging system 114 may represent a non-thermal imaging system comprising a non-thermal optical system (represented by the VL optical system 1141) and a non-thermal detector (represented by the VL detector 1142) responsive to non-thermal radiation. For example, electron multiplying CCD (EMCCD) sensors, scientific CMOS (sCMOS) sensors, intensified-charge-coupled-device (ICCD) sensors, as well as CCD-based and CMOS-based sensors discussed above and/or other suitable sensors, may be used to implement the non-thermal detector (represented by the VL detector 1142) to detect NIR light, SWIR light, and/or other non-thermal light.

Figure 2:
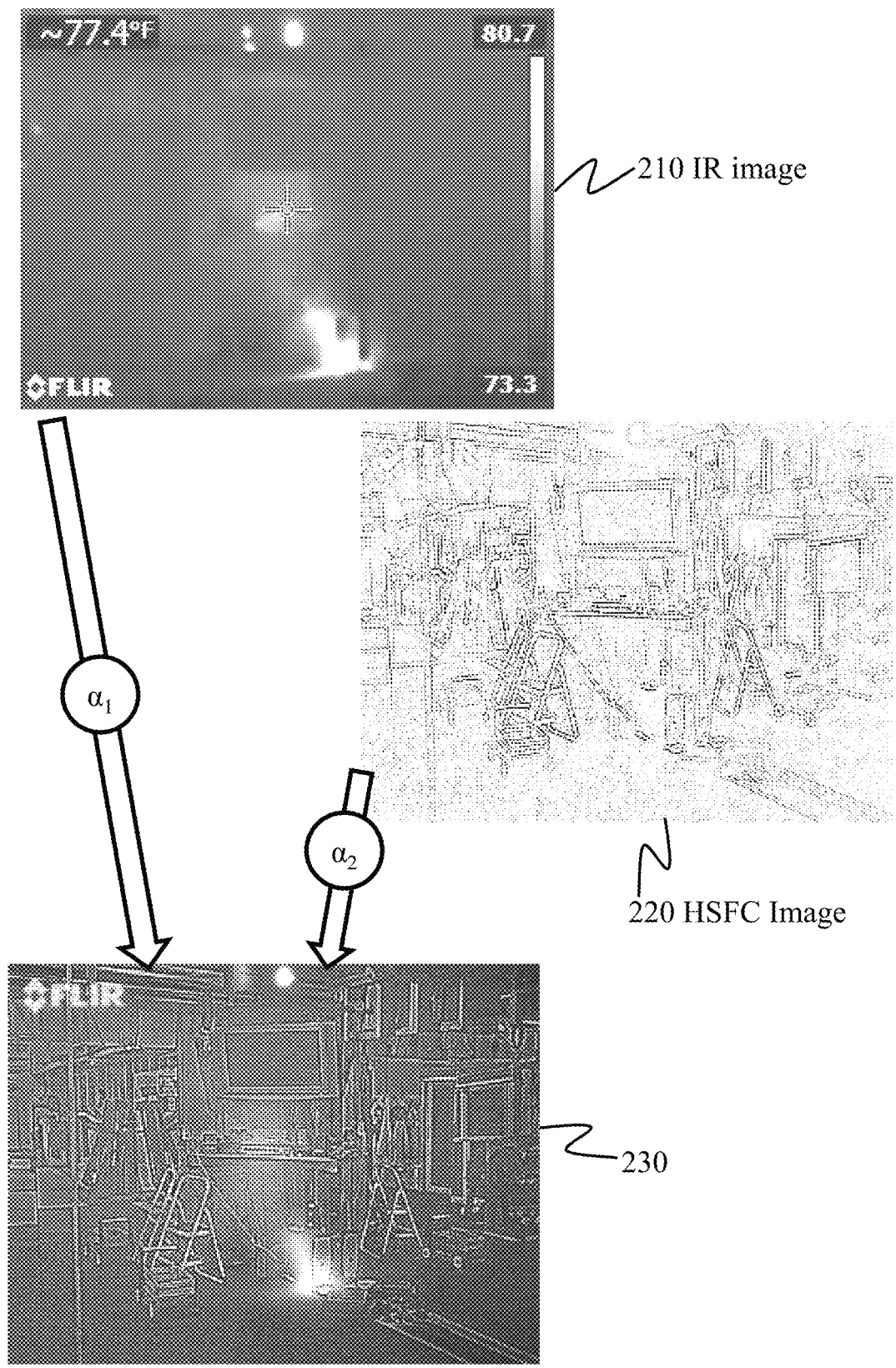
FIG. 2 illustrates an example of how a contrast-enhanced combined image generated in accordance with one or more embodiments of the disclosure.

FIG. 2 illustrates an example of how a contrast-enhanced combined image 230 may be generated according to one or more embodiments of the disclosure, wherein a thermal image 210 is combined with a HSFC image 220. A thermal image 210 is captured by an IR imaging system 113 (as shown in FIG. 1) and a corresponding visual light image (not shown) is captured by a VL imaging system 114. An HSFC image 220 is further obtained based on the visual light image, e.g. by performing high pass filtering or edge detection on the visual light image in a manner as would be understood by one skilled in the art. A contrast-enhanced combined image 230 is then generated based on the thermal image 210, on an image luminance weight $\alpha_1$ for the thermal image 210, on the HSFC image 220 and on an image luminance weight $\alpha_2$ for the visual light image by combining, e.g. adding or multiplying, the luminance component of each pixel value/data value of the thermal image 210 weighted with $\alpha_1$ with the corresponding luminance component of each pixel value/data value of HSFC image 220 weighted with $\alpha_2$. The resulting combined image 230 presents the depicted scene with visibly represented geometrical as well as thermal features.

Method Embodiments

As described and in accordance with one or more embodiments of the disclosure, the contrast-enhanced combined image may be improved in situations with inferior focus settings of the IR imaging system, varying distances to objects in the depicted scene or absence of corner or edges in the depicted scene. Embodiments of the disclosure solve this by image processing luminance components of pixel values comprised in the HSFC image and/or the thermal image based on a blending measure $B_m$ and generating a contrast-enhanced combined image 230 based on the processed luminance components of pixel values comprised in the HSFC image. Different variants are provided by one or more embodiments. In embodiments, image processing comprises applying a luminance weight $\alpha_2$ to luminance components of the HSFC image, wherein the luminance weight $\alpha_2$ is determined based on a blending measure $B_m$. In embodiments, image processing may comprise blurring the HSFC image based on a blending measure $B_m$. In embodiments, image processing may comprise applying a luminance weight $\alpha_1$ to luminance components of the thermal image and applying a luminance weight $\alpha_2$ to luminance components of the HSFC image, wherein the luminance weights $\alpha_1$ and $\alpha_2$ are determined based on a blending measure $B_m$.

Figure 3:
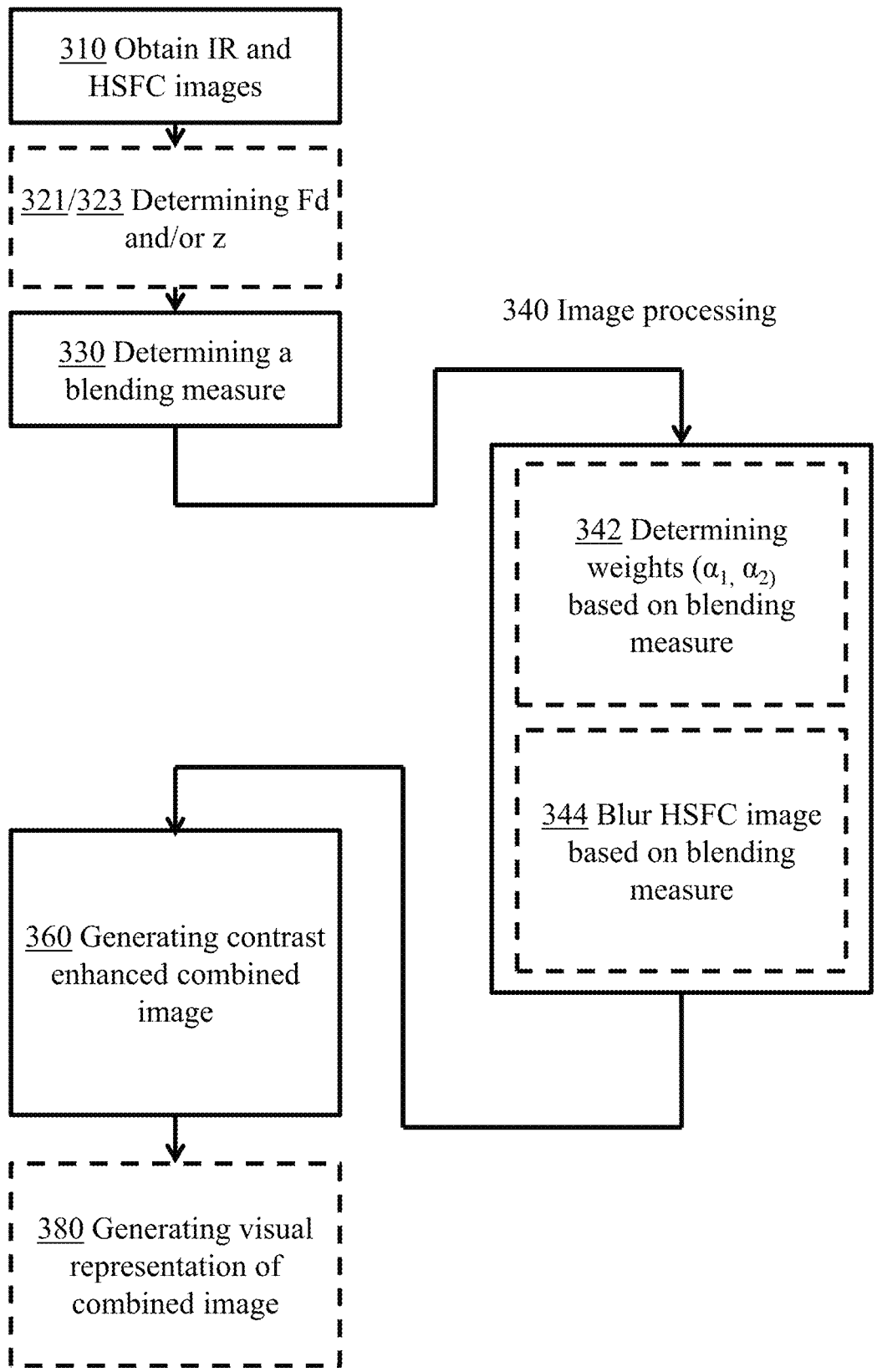
FIG. 3 shows a flowchart illustrating a method of generating a contrast-enhanced combined image based on a High Spatial Frequency Content (HSFC) image and an infrared (IR) image in accordance with one or more embodiments of the disclosure.

FIG. 3 shows a flowchart illustrating a method for generating a contrast-enhanced combined image based on a High Spatial Frequency Content (HSFC) image and an infrared (IR) image according to one or more embodiments of the disclosure. In embodiments, referring to FIG. 3 and FIG. 2, the method comprises the following steps:

Step 310: Obtaining a thermal (IR) image 210 (as shown in FIG. 2) and a HSFC image 220 (as shown in FIG. 2) depicting substantially the same scene. Optionally, embodiments comprise aligning the thermal image 210 and the HSFC image.

Optional Step 321: Determining a focusing distance $F_d$, and/or

Optional step 323: Determining a distance z of a depicted scene. Embodiments comprising these steps are further explained below.

Step 330: Determining a blending measure $B_m$.

Step 340: Image processing luminance components of pixel values of the HSFC image and/or of the thermal image based on the determined blending measure $B_m$. In one or more embodiments Step 340 optionally comprises Step 342 of determining an image luminance weight $\alpha_1$ for the thermal image and an image luminance weight $\alpha_2$ for the HSFC image based on the blending measure $B_m$, and/or Step 344 of Blurring the HSFC image based on the blending measure $B_m$. Step 342 and Step 344 are further explained below.

Embodiments comprising step 342 wherein generating a contrast-enhanced combined image 230 is based on a thermal image luminance weight $\alpha_1$ and a visual light image luminance weight $\alpha_2$ may comprise the following. For example, generating a contrast-enhanced combined image 230 (as shown in FIG. 2) may be performed by combining, e.g. adding or multiplying, the luminance component of each pixel value/data value of the thermal image 210 weighted with $\alpha_1$ and the corresponding luminance component of each pixel value/data value of the HSFC image 220 weighted with $\alpha_2$. For example, the corresponding luminance components are the luminance components of the thermal image and of the HSFC image having the same pixel coordinates. In another example, the corresponding luminance components is the luminance component of a pixel value with a first pixel coordinate in the thermal image and the luminance component in the HSFC image of a pixel value with a transformed, second, pixel coordinate, where the second pixel coordinate is obtained by transforming the first pixel coordinate with a coordinate transformation relation $T(x,y,z)$ or $T(x,y,\theta,z)$, such as the parallax relation.

Embodiments comprising the Step 344 of blurring the HSFC image 220 may comprise applying a Gaussian image-blurring filter with a standard deviation $\sigma$. The standard deviation $\sigma$ may be dependent on the blending measure $B_m$. In one example, the standard deviation $\sigma$ is inversely proportional to the blending measure $B_m$. In another example blurring the HSFC image 220 comprises applying a Gaussian image-blurring filter with a kernel size $K_{size}$. For example, the kernel size $K_{size}$ may be dependent on the blending measure $B_m$. In one example, the kernel size $K_{size}$ may be inversely proportional to the blending measure $B_m$. In yet an example the kernel size $K_{size}$ is equal to a 10 pixel radius when the blending measure $B_m$ is equal to 0 and the kernel size $K_{size}$ is equal to a 0 pixel radius when the blending measure $B_m$ is equal to 1, where a blending measure $B_m$ of 1 indicates an imaging system substantially in focus or edges present in the scene thereby producing images of high quality, and a blending measure $B_m$ of 0 indicates an imaging system substantially out of focus or no edges present in the scene thereby producing images of low quality.

Step 360: Generating a contrast-enhanced combined image 230 based on the processed luminance components.

Optional Step 380: Generating a visible representation of the combined image. Optionally, embodiments useful in common use cases comprise generating and possibly presenting on a display a visible representation of the combined image.

Aligning Thermal Image and Visual Light Image

In embodiments, again referring to FIG. 1 and FIG. 2, a thermal image 210 depicting a scene is captured by an IR imaging system 113, and substantially simultaneously a visual light image (not shown) depicting the same scene is captured by a VL imaging system 114. For processing and generating a contrast-enhanced image, a thermal image is obtained or retrieved by a processor 112 directly from the IR imaging system 113, from an intermediate frame buffer or from a memory 115 storing captured thermal images. Similarly, the visual light image is obtained or retrieved by a processor 112 directly from the VL imaging system 114, from an intermediate frame buffer or from a memory 115 storing captured VL images. As has been explained above, the VL image is used as a HSFC image or used for deriving or generating a HSFC image. The thermal image and the visual light image or the HSFC image may further be aligned using a parallax relation such that pixels with the same pixel coordinate in the thermal image, i.e. the IR image, and the VL image or HSFC image represent the same objects in the scene and cropped such that the thermal image and the HSFC image have the same pixel dimensions, i.e. the same number of rows and columns. An HSFC image is for example obtained based on the visual light image, e.g. by performing high pass filtering or edge detection of the visual light image in a manner as would be understood by one skilled in the art.

Scaling Luminance Components

In one or more embodiments, the generating of a contrast-enhanced combined image 230 (as shown in FIG. 2) comprises applying image luminance weights to luminance components of the respective images. This may be performed such that, for each IR image data value/pixel value in each pixel coordinate in the thermal image 210 the luminance component is scaled based on the image luminance weight $\alpha_1$. Similarly, for each HSFC image data value/pixel value in each pixel coordinate in the HSFC image 220 the luminance component is scaled based on the image luminance weight $\alpha_2$. For example, the luminance components of a contrast-enhanced combined image may then be generated by combining each scaled luminance component of the HSFC image data value/pixel value with the scaled luminance component of the thermal image data value/pixel value having the same or corresponding pixel coordinate.

In an example, expressing that this is done by adding the scaled luminance component of the HSFC image data value/pixel value for the second row and third column in the HSFC image with the scaled luminance component of the thermal image data value/pixel value the second row and third column in the thermal image, this can be expressed for example as:

contrast enhanced combined image pixel
value$_{row=2,col=3}$=$\alpha_1$×IR image pixel
value$_{Row=2,col=3}$+$\alpha_2$×HSFC image pixel
value$_{Row=2,col=3}$ In a similar example, where a coordinate transformation relation $T(x,y,z)$ or $T(x,y,\theta,z)$, such as the parallax relation, is used to determine the pixel coordinate in the HSFC image that correspond to a pixel coordinate in the thermal image, this can be expressed for example as:

contrast enhanced combined image pixel
value$_{row=2,col=3}$=$\alpha_1$×IR image pixel
value$_{Row=2,col=3}$+$\alpha_2$×HSFC image pixel
value$_{T(Row=2,col=3,z)}$.

In one or more embodiments, an IR global luminance weight $\beta_{IR}$ is comprised to describe the weight of IR image luminance components and HSFC global luminance weight $\beta_{HSFC}$ describe the weight of HSFC image luminance component, wherein each data value$_{x,y}$/pixel value$_{x,y}$ of a contrast-enhanced combined image is determined as: $\beta_{IR}$*luminance component$_{IR,x,y}$+$\beta_{HSFC}$*luminance component$_{HSFC,x,y}$.

For example, the global luminance weights $\beta_{IR}$ and $\beta_{HSFC}$ may be predefined and stored, e.g. in memory 115 (as shown in FIG. 1). In yet an example, the global luminance weights $\beta_{IR}$ and $\beta_{HSFC}$ describe a predetermined suitable mix of IR image components and HSFC image components when both VL and IR imaging systems are focused on the scene, thus providing a high quality contrast-enhanced combined image. In yet an embodiment, each data value$_{x,y}$/pixel value$_{x,y}$ of a contrast-enhanced combined image is determined as $\beta_{IR}$*$\alpha_1$*luminance component$_{IR,x,y}$+$\beta_{HSFC}$*luminance component$_{HSFC,x,y}$, in one example, and in another example:

contrast enhanced combined image pixel
value$_{row=x,col=x}$=$\beta_{IR}$*$\alpha_1$*IR image pixel
value$_{row=x,col=y}$+$\beta_{HSFC}$*$\alpha_2$*HSFC image pixel
value$_{row=x,col=y}$ In one example, $\alpha_1$ is determined to 1 and $\alpha_2$ is determined to 1, thus maintaining the predetermined global luminance weights $\beta_{IR}$ and $\beta_{HSFC}$. In yet an example, $\alpha_1$ and $\alpha_2$ are determined to 1 and the HSFC image is blurred based on the blending measure $B_m$.

Determining Blending Measure $B_m$ Based on Distance to Scene z

Figure 4A:
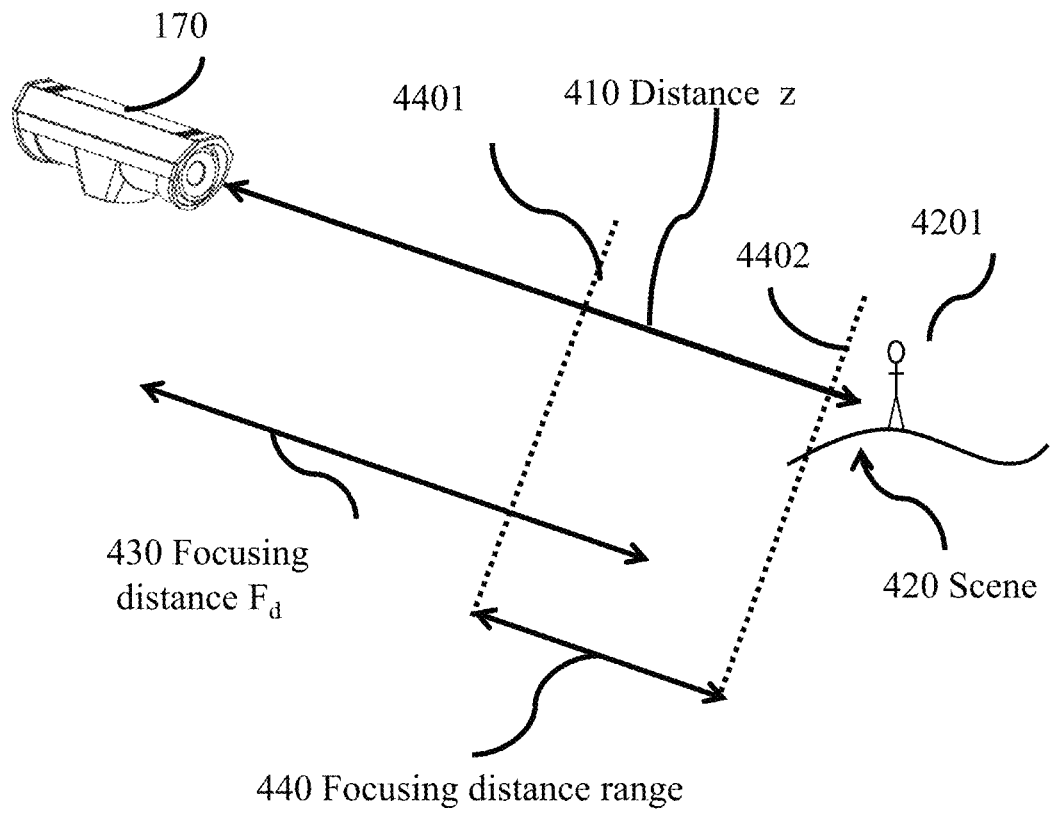
FIGS. 4A and 4B illustrate the determining of a blending measure $B_m$ based on an estimated distance z from the thermal imaging device to an object in the captured scene in accordance with one or more embodiments of the disclosure.
Figure 4B:
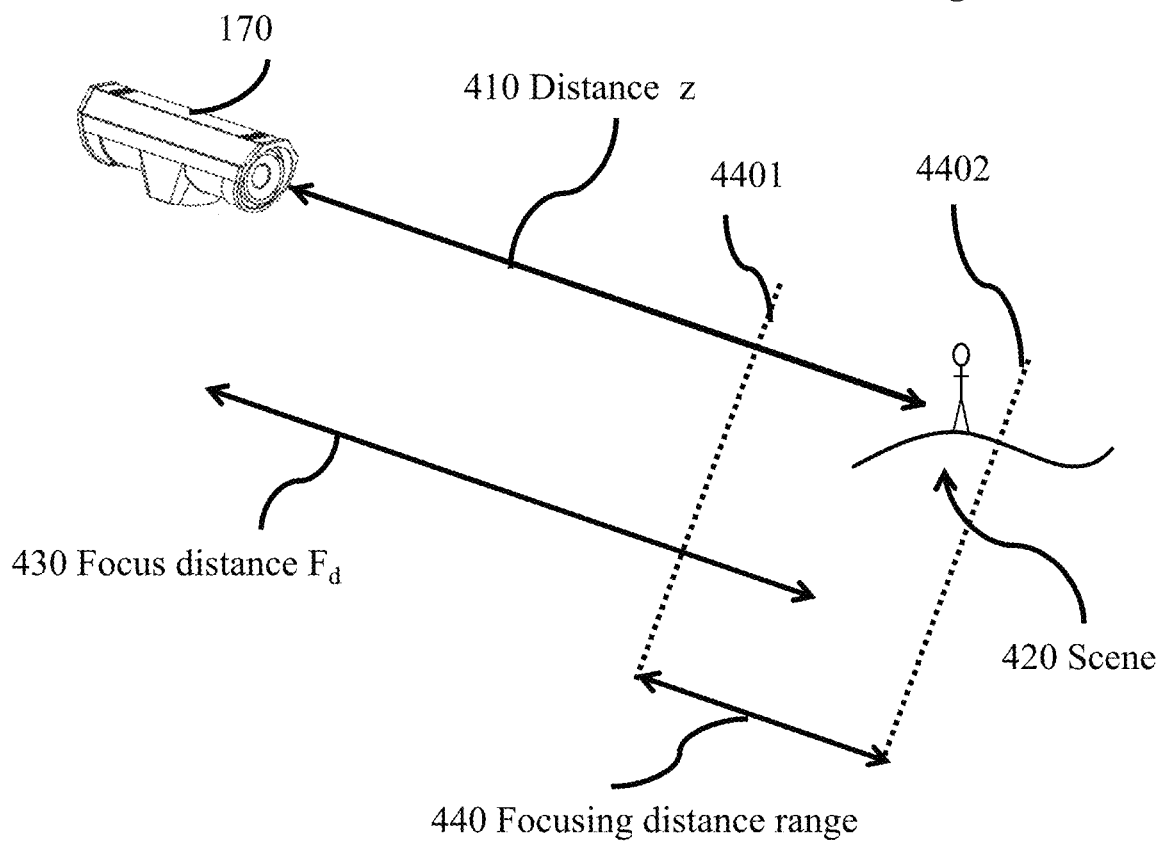

FIG. 4A and FIG. 4B illustrate examples of determining a blending measure $B_m$ based on an estimated distance z 410 from the thermal imaging device 170 (as shown in FIG. 1) to a captured scene 420 or to an object 4201 in the captured scene 420 and/or on a focusing distance $F_d$ 430, comprised in one or more embodiments. In one or more embodiments, the distance z 410 and/or the focusing distance $F_d$ 430 are estimated for the IR imaging system 113 and/or for the VL imaging system 114.

In one or more embodiments, the distance z 410 determined in optional step 321 referred to in FIG. 3, may for example be estimated by a distance measuring device 119 shown in FIG. 1. In another example, the distance z 410 may be estimated by stereo triangulation using a secondary VL imaging system in a known manner as would be understood by one skilled in the art. In yet another example, the distance z 410 in step 321 is estimated based on IR image 210 (as shown in FIG. 2) and VL/HSFC image 220 relative an offset or displacement and a predetermined parallax relation in a known manner as would be understood by one skilled in the art. So for example, a displacement of a corner distinguishable in the thermal image and the same corner distinguishable in the HSFC image is used to determine relative offset or displacement and the distance z is obtained from a coordinate transformation relation $T(x,y,z)$ or $T(x,y,\theta,z)$, such as the parallax relation.

In one or more embodiments, estimating the focusing distance $F_d$ 430 is performed for the IR imaging system 113 (as shown in FIG. 1) and/or for the VL imaging system 114. For example, the focusing distance $F_d$ may be derived from a focus setting of an IR optical system 1131 or of a VL optical system 1141, e.g. by determining a position of a focus arrangement such as a focus motor operating the focus of the IR optical system 1131 or the VL optical system 1141. In another example the focusing distance $F_d$ may be derived from the focus setting of an IR optical system 1131 or a VL optical system 1141 by determining a position of a manual focus arrangement, such as a focus ring, operating the focus of the IR optical system 1131 or the VL optical system 1141.

A blending measure $B_m$ is in one or more embodiments determined based on the estimated distance z 410 and on an estimated focusing distance $F_d$ 430. The blending measure $B_m$ may be determined based on a predetermined quota threshold for the estimated focusing distance and the estimated distance. For example, the blending measure $B_m$ may be determined to 1, e.g. indicating the scene being in focus or edges being present in the scene, if:

$$\frac{\text{estimated focusing distance } Fd\ 430}{\text{estimated distance } z\ 410} \begin{cases} \geq 1 - quota_{threshold} \\ \leq 1 + quota_{threshold} \end{cases}$$

In another example, the blending measure $B_m$ is determined to 0, e.g. indicating the scene being out of focus or no edges present in the scene, if the quota:

$$\frac{\text{estimated focusing distance } Fd\ 430}{\text{estimated distance } z\ 410} \begin{cases} < 1 - quota_{threshold} \\ > 1 + quota_{threshold} \end{cases}$$

For example, the quota threshold for the estimated focusing distance and the estimated distance may be selected from a range of 10%-50%.

FIG. 4A illustrates a situation where the estimated distance z 410 is outside a focusing distance range 440, and FIG. 4B illustrates a situation where the distance z 410 is within or equal to the endpoints of the IR focusing distance range 440. For addressing these situations one or more embodiments comprises setting the blending measure $B_m$ dependent on whether the estimated distance z 410 is within or without the focusing distance range 440 of the thermal imaging device. For example, the blending measure $B_m$ is determined to 0 if the estimated distance z 410 is outside the focusing distance range 440, and/or for example the blending measure $B_m$ is set to 1 if the estimated distance z 410 is within or equal to the endpoints of the IR focusing distance range 440.

The IR focusing distance range 440 may comprise a minimum acceptable focusing distance value 4401 and a maximum acceptable focusing distance value 4402. In one or more embodiments, the focusing distance range 440 is determined based on the estimated focusing distance $F_d$ 430 and a focusing_distance_margin. For example, the minimum acceptable focusing distance value may be determined as the estimated focusing distance $F_d*(1-\text{focusing\_distance\_margin})$ and the maximum acceptable focusing distance value may be determined as the estimated focusing distance $F_d*(1+\text{focusing\_distance\_margin})$.

In one example the focusing margin is within a predetermined range of a factor 0.10-0.50 or percentage 10%-50% of the estimated focusing distance $F_d$. In yet an example, the estimated focusing distance $F_d$ is 10 meters and the focusing_distance_margin is 20%*10 meter=2 meters. In yet an example, the minimum acceptable focusing distance value is determined as (10−2=8) meters and the maximum acceptable focusing distance value is determined as (10+2=12) meters.

In one or more embodiments, determining a blending measure $B_m$ is based on a blending relation dependent on the estimated distance z, the estimated focusing distance $F_d$ and the focusing distance range 440. In such embodiments: determining the blending measure $B_m$ comprises: Setting the blending measure $B_m$ to blending measure $$B_m = 1 - \frac{|z - F_d|}{z + F_d}$$

if it is determined that the estimated distance z 410 is within or equal to the endpoints of the focusing distance range 440; and/or determine blending measure $B_m$ to 0 if it is determined that the estimated distance z 410 is outside the endpoints of the focusing distance range 440.

Determining Blending Measure on an Image Sharpness Relation

Figure 5:
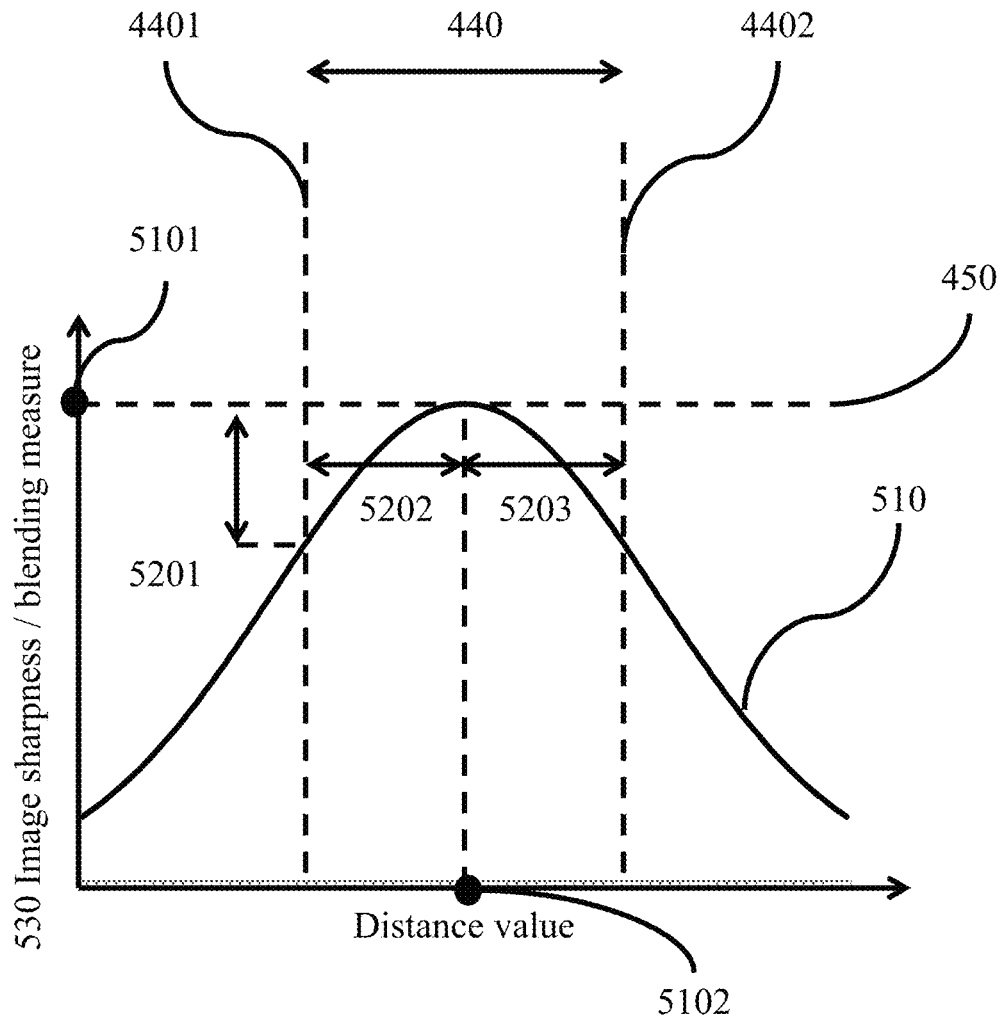
FIG. 5 shows a graph illustrating examples of how a blending measure may be determined based on an estimated distance z and a focusing distance range in accordance with one or more embodiments of the disclosure.

FIG. 5 illustrates examples of how a blending measure $B_m$ may be determined based on an image sharpness relation (ISR) 510 in accordance with one or more embodiments of the disclosure. In such embodiments, a focusing distance range 440 is determined based on an Image Sharpness Relation ISR 510 dependent on a distance value, that is, based on an ISR as a function of distance z, herein denoted ISR (distance z). In FIG. 5, a graph shows an example of an Image Sharpness Relation ISR 510 with values for the Image Sharpness 530 on the vertical axis plotted against distance values on the horizontal axis. The image sharpness relation 510 provides an image sharpness value 530 based on a distance value or vice versa. For example, an Image Sharpness Relation ISR 510 may be obtained as a predetermined relation previously stored in a memory 115 of a thermal imaging device 170 (as shown in FIG. 1).

In one or more embodiments, the image sharpness relation 510 provides a blending measure $B_m$ value equal to or directly derivable from an image sharpness value 530 based on the estimated distance z 410 (as shown in FIG. 4) as described in the previous section, i.e. ISR as a function of distance z denoted ISR(distance z).

Further one or more embodiments comprise estimating a focusing distance $F_d$ based on an image sharpness relation 510. For example, this is performed by determining a local maximum of the image sharpness value 5101 of the image sharpness relation 510, determining the distance value 5102 associated with the local maximum and setting the estimated focusing distance $F_d$ equal to said associated distance value 5102. Determining a focusing distance range 440 may be based on a blending-measure margin 5201 and the local maximum image sharpness value 5101, e.g. by determining a first estimated focusing distance $F_{d1}$ where ISR($F_{d1}$)=local maxima image sharpness value 5101-blending-measure margin 5201 as a minimum acceptable focusing distance value 4401 and by determining a second estimated focusing distance $F_{d2}$ where the ISR($F_{d2}$)=local maximum image sharpness value 5101+blending-measure margin 5201 is determined as a maximum acceptable focusing distance value 4402, wherein $F_{d2} > F_{d1}$.

One or more embodiments comprise determining a focusing distance range 440 based on a local maximum image sharpness value 5101, a first predetermined focusing_distance_margin 5202 and a second predetermined focusing_distance_margin 5203. For example, this may be performed by determining a first estimated focusing distance $F_{d1}$ where the ISR($F_{d1}$)=local maximum image sharpness value 5101-first focusing_distance_margin 5202 as the minimum acceptable focusing distance value 4401 and by determining a second estimated focusing distance $F_{d2}$ where ISR($F_{d2}$)=local maxima image sharpness value 5101+second focusing_distance_margin 5203 is determined as the maximum acceptable focusing distance value 4402, wherein $F_{d2} > F_{d1}$. In one example, the first focusing_distance_margin 5202 is selected identical to the second focusing_distance_margin 5203. In another example, the first and second focusing_distance_margin is obtained based on a predetermined depth of field relation for the IR/VL imaging system 113, 114. In yet an example, the depth of field relation is obtained during production of the thermal imaging device 170 in a calibration procedure in a manner as would be understood by one skilled in the art.

In one or more embodiments determining the blending measure $B_m$ comprises determining a blending measure $B_m$ to the ISR value corresponding to the distance value of distance z 410 if it is determined that distance z 410 is within or equal to the endpoints of the focusing distance range 440; and/or determining a blending measure $B_m$ to 0 if it is determined that $F_{d\text{-current}}$ is outside the endpoints of the IR focusing distance range.

Determine Blending Measure $B_m$ Based on a Parallax Error Relation

Figure 6:
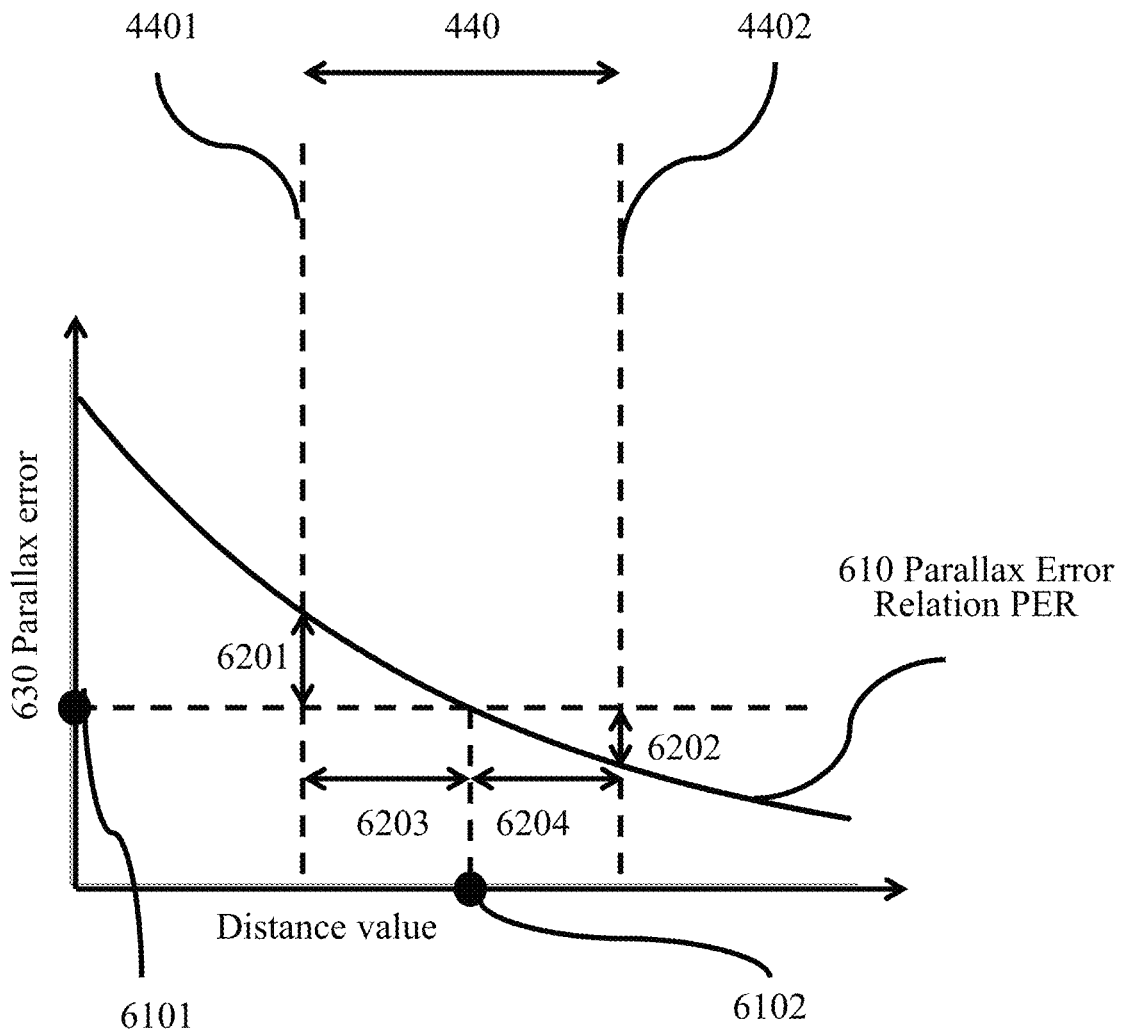
FIG. 6 shows a graph illustrating examples of how a blending measure may be determined based on an estimated distance z from the thermal imaging device to the scene and a focusing distance range in accordance with one or more embodiments of the disclosure.

FIG. 6 illustrates examples of how a blending measure may be determined based on an estimated distance z 410 (as shown in FIG. 4) from the thermal imaging device 170 to the scene 420 and a focusing distance range 440 in accordance with one or more embodiments of the disclosure, wherein the focusing distance range 440 is determined based on a Parallax Error Relation (PER) 610 dependent on a distance value, that is, based on a PER as a function of a distance value, herein denoted PER(distance value). In FIG. 6, a graph shows an example of Parallax Error Relation PER 610 with values for the parallax error 630 on the vertical axis plotted against distance values on the horizontal axis. The Parallax Error Relation 610 provides a parallax error value 6101 based on a distance value 6102 or vice versa. In one example a parallax error value describes IR image pixel to HSFC image pixel offsets/displacements, such as described herein above. For example, a Parallax Error Relation PER 610 may be obtained as a predetermined relation previously stored in a memory 115 of a thermal imaging device 170.

In one example, the Parallax Error Relation 610 provides a parallax error value 630 based on the estimated distance z 410, i.e. PER(z).

In a further example, the Parallax Error Relation 610 is based on the focusing distance range 440. The focusing distance range may comprise a minimum acceptable focusing distance value 4401 and a maximum acceptable focusing distance value 4402.

One or more embodiments comprise determining a focusing distance range 440 based on a reference distance value $dist_{ref}$, a first parallax error margin 6201 and a second parallax error margin 6202. For example, the reference distance value $dist_{ref}$ may be determined as the estimated distance z 410 or the estimated focusing distance $F_d$ 430. For example, one or more embodiments comprising determining a focusing distance range 440 may further comprise a selection of:

Determining a minimum focusing distance $F_{d1}$ where $PER(F_{d1})=PER(dist_{ref})-$first parallax error margin 6201 or where $PER(F_{d1})=PER(dist_{ref})+$first parallax error margin 6201; or Determining a minimum focusing distance $F_{d1}$ as the minimum acceptable focusing distance value 4401; and Determining a maximum focusing distance $F_{d2}$ where $PER(F_{d2})=PER(dist_{ref})-$parallax error margin 6202 or where $PER(F_{d2})=PER(dist_{ref})+$parallax error margin 6202; or Determining the maximum focusing distance $F_{d2}$ as the maximum acceptable focusing distance value 4402.

In these examples, the focusing distances $F_{d2} > F_{d1}$.

In one or more embodiments, determining a focusing distance range 440 are based on the reference distance value $dist_{ref}$, a first predetermined focusing_distance_margin 6203 and a second predetermined focusing_distance margin 6204. For example, determining the minimum acceptable focusing distance value 4401 may be determined as the reference distance value $dist_{ref}$-the first predetermined focusing_distance_margin 6203 and determining the maximum acceptable focusing distance value 4402 as the reference distance value $dist_{ref}$+the second predetermined focusing_distance_margin 6204. In one example, the first focusing_distance_margin 6203 is selected identical to the second focusing_distance_margin 6204. In another example, the first 6203 and second focusing_distance_margin 6204 may be obtained based on a predetermined depth of field relation for the IR/VL imaging system 113, 114. In yet an example, the depth of field relation is obtained during production of the thermal imaging device 170 in a known calibration procedure as would be understood by one skilled in the art.

In one or more embodiments comprising determining a reference distance value $dist_{ref}$, the reference distance value $dist_{ref}$ is determined based on a position of a focus arrangement comprised in an optical system 1131, 1141 of a thermal imaging device 170. For example, determining the blending measure $B_m$ may comprise:

determining blending measure $B_m$ as 1 if it is determined that $dist_{ref}$ is within or equal to the endpoints of the focusing distance range 440; or determining the blending measure $B_m$ to 0 if it is determined that $dist_{ref}$ is outside the endpoints of the IR focusing distance range.

In another example, determining the blending measure $B_m$ may comprise:

determining blending measure $B_m$ as $PER(dist_{ref})$ if it is determined that $dist_{ref}$ is within or equal to the endpoints of the focusing distance range 440; or determining the blending measure $B_m$ to 0 if it is determined that $dist_{ref}$ is outside the endpoints of the IR focusing distance range.

Determine Blending Measure $B_m$ Based on an Edge Measure

As mentioned previously, under certain circumstances, such as in the case of absence of corners or edges in the depicted scene, it will make no sense to combine IR and HSFC images as it would mainly mean adding noise to the thermal image without adding any useful information. In embodiments, an HSFC image edge measure indicating the number or the amount of edges detected in the scene is determined and the blending measure is determined based on the image edge measure.

One or more embodiments further comprise determining an image edge measure $IE_m$ based on the HSFC image, and determining a blending measure $B_m$ based on the image edge measure $IE_m$. For example, the blending measure $B_m$ is determined to 0 if the image edge measure $IE_m$ is below a predetermined image edge threshold $IE_{threshold}$, i.e. $IE_m < IE_{threshold}$.

For example, if the estimated distance z 410 is within or equal to the endpoints of the focusing distance range 440 but the determined image edge measure $IE_m$ is below a predetermined image edge threshold $IE_{threshold}$, the blending measure $B_m$ is then determined to 0, even though the IR imaging system is in focus. In other words, only the thermal image 210 will be used to generate the contrast-enhanced combined image 230 if no edges are detected in the HSFC image.

Generating Contrast-enhanced Combined Image Based on Blurred HSFC Image

Under certain circumstances the contrast-enhanced image may produce a result that a user may perceive as satisfying although the thermal image actually may be out of focus. One or more embodiments address this phenomenon in a solution that comprises the measures of intentionally blurring the HSFC image based on the blending measure $B_m$ before combining it with the thermal image. This is particularly advantageous in thermal imaging devices configured with manual focus arrangements, such as a focus ring, for the IR imaging system. The user will then perceive the combined image as out-of-focus and manually adjust the focus of the IR imaging system 113. As the artificial blurring of the HSFC image is performed in relation to the blending measure $B_m$, the edges or corners in the contrast-enhanced combined image will also appear un-sharp or out-of-focus when displayed to the user, thereby giving the user a motivation to adjust the focusing of the thermal imaging system 113. When the thermal imaging system and the visual light imaging system both are in-focus a combined image based on a sharp HSFC image will be presented to the user.

Figure 7A:
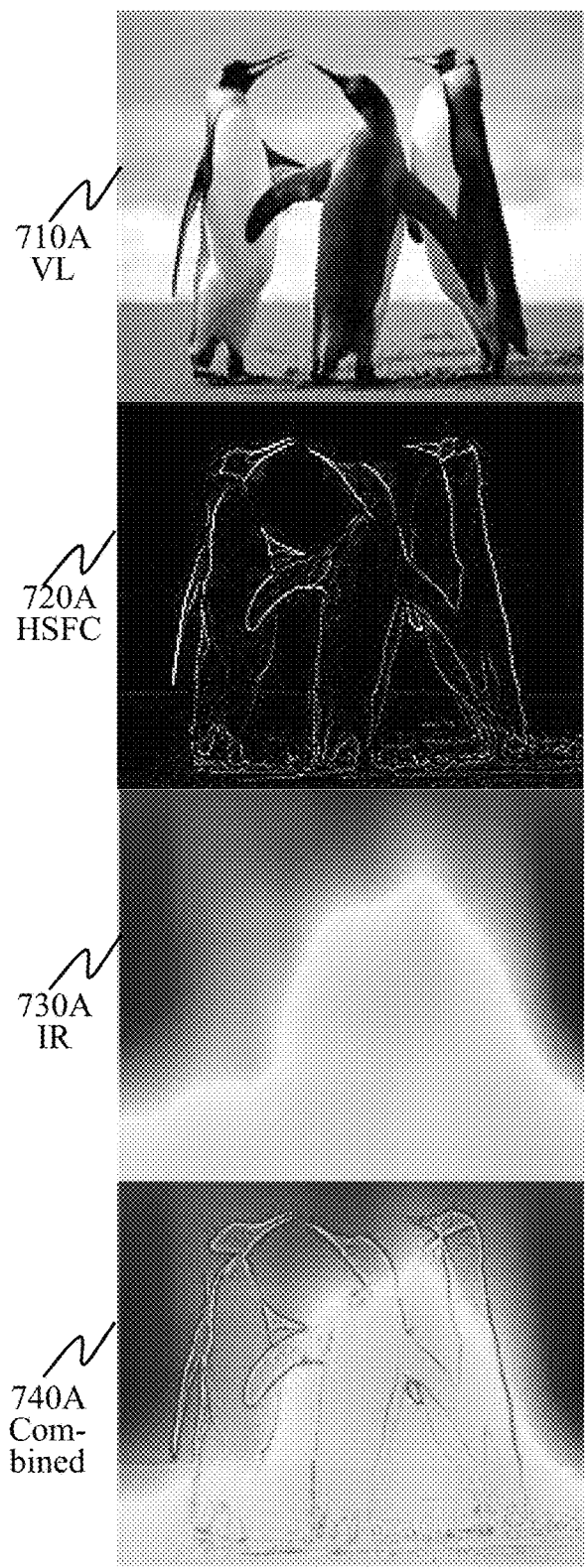
FIGS. 7A and 7B show examples of a visual light image, a HSFC image, a thermal image, and a contrast-enhanced combined image depicting the same scene being captured in accordance with one or more embodiments of the disclosure.

FIG. 7A illustrates a series of images (column of images to the left) captured or generated in accordance with one or more embodiments of the disclosure. A VL visual light image 710A and an IR thermal image 730A depicting the same scene are captured by a thermal imaging device 170. The IR imaging system 113 is in this instance out of the focusing range 440 and the VL imaging system 114 is within the focusing range 440, thus the thermal image is out-of-focus and the visual light image is in-focus. An HSFC image 720A is further obtained, e.g. comprising high-pass filtering of the captured visual light image 710A. A contrast-enhanced combined image 740A is then generated based on an image luminance weight α1 and an image luminance weight α2. As the inherent properties of a thermal image, e.g. being noisy and having low contrast, makes it difficult for a user of a thermal imaging device 170 to comprehend whether the IR imaging system 113 is in-focus or out-of-focus, the often user perceives the image to be of low quality, to be a ghost image or generally confusing. Now, with a combined image 740A having contrast-enhanced edges the user may be tricked into believing that the combined image is satisfying although thermal image part is out-of-focus.

Figure 7B:
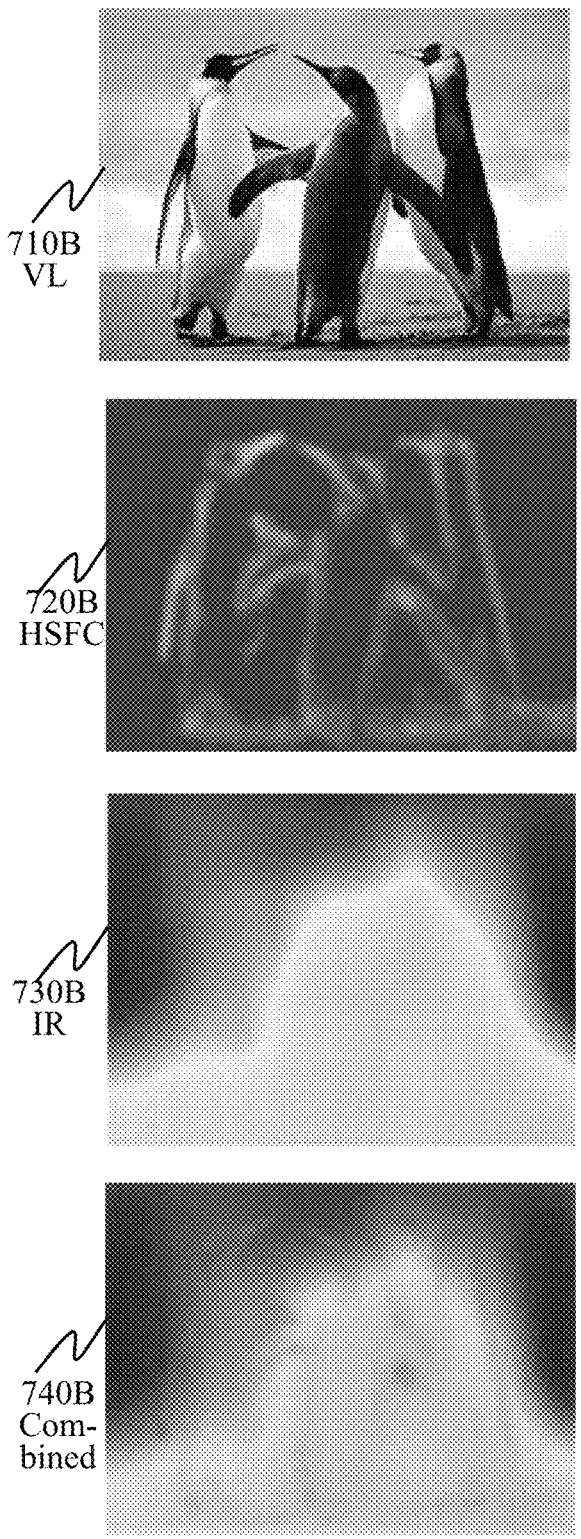

FIG. 7B illustrates a series of images (column of images to the right) captured or generated in accordance with one or more embodiments of the disclosure and further comprising generating a combined image based on a blurred HSFC image. FIG. 7B shows an embodiment of the invention, wherein, a visual light image 710B and a thermal image 730B depicting the same scene are captured by a thermal imaging device 170. Again, as in FIG. 7A, the IR imaging system 113 is out of the focusing range 440 and the VL imaging system 114 is within the focusing range 440, thus the thermal image is out-of-focus and the visual light image is in-focus. An HSFC image 720B is obtained, e.g. by high-pass filtering of the captured visual light image 710B. In embodiments, the HSFC image 720B is (as indicated in step 344 described in relation to FIG. 3 above) blurred based on the blending measure, e.g. by applying a Gaussian function blurring filter as would be understood by one skilled in the art. An instance of a contrast-enhanced combined image 740B is then generated based on an image luminance weight α1 and an image luminance weight α2. As can be seen in FIG. 7B the combined image is generated with HSFC image luminance components blurred and therefore resulting in a generally un-sharp image. As a consequence, the probability that the user comprehends that the IR imaging system 113 is out-of-focus is raised and the user may be motivated to try to bring the thermal imaging system into focus until a sharp combined image.

In one or more embodiments comprising blurring an HSFC image based on a blending measure $B_m$, is performed when it is determined that an estimated distance z or an estimated focusing distance $F_d$ is within or equal to the endpoints of the IR focusing distance range 440. The transition between blurring the HSFC image and not blurring the HSFC image is preferably made smoothly and proportional to the blending measure $B_m$, e.g. determined as described in relation to FIG. 6.

Segmenting Images

In some configurations of a thermal imaging device 170, the depth of field (DOF) of the IR imaging system 113 and the VL imaging system 114 may differ. For example, the distance to different objects in the captured scene might differ such that some objects are within the depth of field (DOF) of the IR imaging system 113 and other objects are not within the depth of field (DOF) of the IR imaging system 113. As explained above, when generating and displaying a visual representation of a contrast-enhanced combined image to a user, the VL and the generated HSFC image might be focused while the thermal image is out-of-focus. Due to the noisy and low-contrast nature of IR images, the user might not understand that this is the case.

When the scene is varying significantly in depth, the focusing distance range 440 of the IR/VL imaging systems may overlap with the distance to the scene for some parts of the image but not for others. This will result in an increased error or offset in the image alignment processing for part of the image, thereby causing partial ghosting or a partial ghost image. In one or more embodiments, this is solved by splitting a thermal image and a HSFC image into segments and performing method steps of the disclosure on each segment, and thereafter combining the segments into a contrast-enhanced combined image.

Figure 8A:
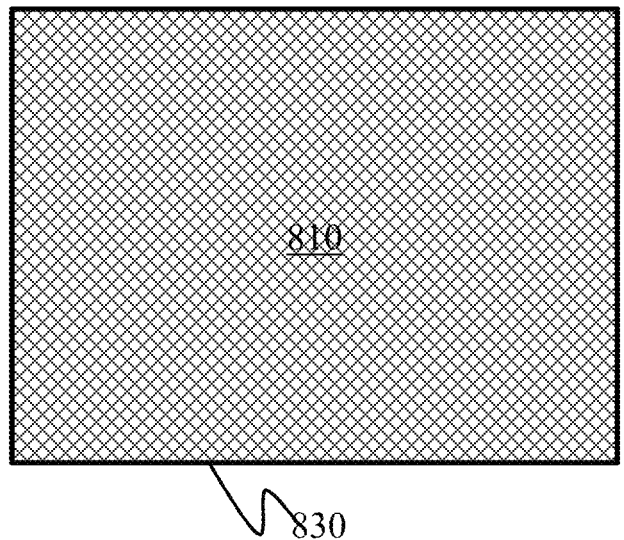
FIG. 8A illustrates the generating of a contrast-enhanced combined image, wherein the contrast-enhanced combined image is based on the entire IR image and the entire HSFC image, and a single segment is generated in accordance with one or more embodiments of the disclosure.
Figure 8B:
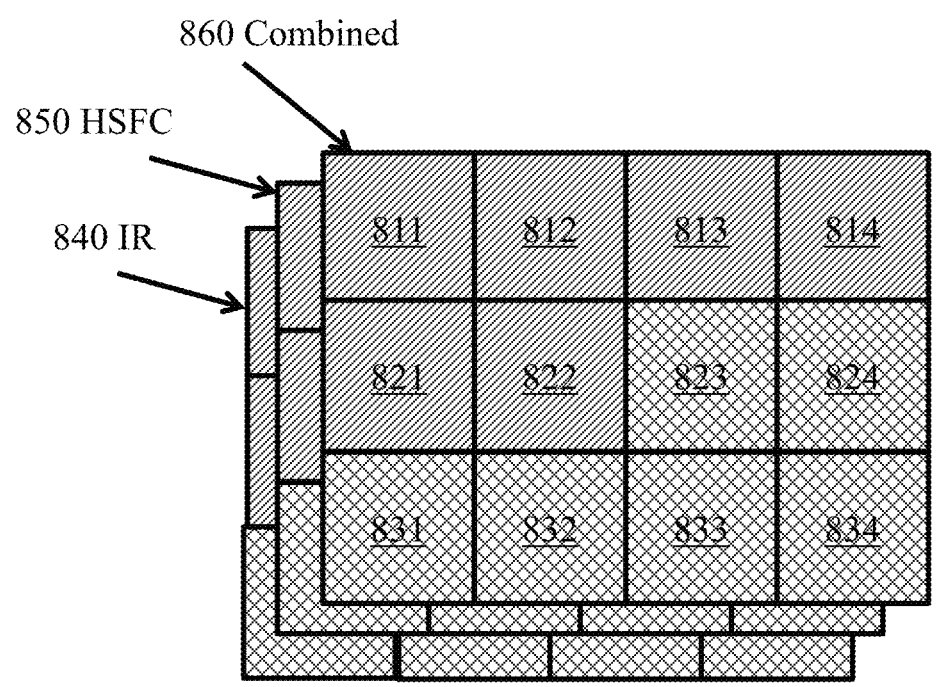
FIG. 8B illustrates the generating of a contrast-enhanced combined image based on IR/HSFC image segments in accordance with one or more embodiments of the disclosure.

FIG. 8A and FIG. 8B illustrate one or more embodiments of the disclosure further comprising generating a contrast-enhanced combined image 830 based on segmenting images. FIG. 8A illustrates a contrast-enhanced combined image 830 based on an entire IR image 210 and an entire HSFC image 220 and generating a single segment 810.

FIG. 8B illustrates a contrast-enhanced combined image 860 based on generating a plurality of IR/HSFC image segments and a plurality of combined image segments 811-814, 821-824, and 831-834. One or more embodiments of the disclosure further comprising generating a contrast-enhanced combined image 860 based on segmenting images, may comprise:

Dividing the thermal image into a plurality N of IR image segments (corresponding to combined image segments 811-814, 821-824, and 831-834);

Dividing the HSFC image into a plurality N of HSFC image segments, wherein the HSFC segments correspond to the IR image segments, e.g. same pixel coordinates or the same transformed pixel coordinates as previously described;

Determining a blending measure $B_m$ comprising generating a segment blending measure $B_{m-segment(sx,sy)}$ for each of N image segments, e.g. by using any of the embodiments described herein;

Combining luminance components comprised in a selected subset of HSFC image segments (corresponding to combined image segments 811-814,821-822) and luminance components comprised in a selected subset of IR image segments (corresponding to combined image segments 811-814, 821-822) based on the luminance weight α1 and the image luminance weight α2 into a set of combined image segments 811-814, and 821-822; and/or Generating a resulting combined image 860 comprising the combined image segments, and preferably the complementary subset of IR image segments (e.g., corresponding to combined image segments 823-824, and 831-834).

For example, blending measures $B_m$ for image segments 811-814,821-822 may be out-of-focus, e.g. outside the range of the local maxima image sharpness value 5101+—blending-measure margin 5201. Blending measures for image segments 823-824,831-834 may be in-focus, e.g. inside the range of the local maxima image sharpness value 5101+— blending-measure margin 5201.

Determine Image Luminance Weights—HSFC Image On/Off

In one or more embodiments of the disclosure, the weight of IR image luminance component is determined only by $α_1$ and the weight of HSFC image luminance component is determined only by $\alpha_2$. Further one or more embodiments comprise a global luminance weight $\beta_{IR}$ describing a predetermined weight of the thermal image luminance component and a global luminance weight $\beta_{HSFC}$ describe a predetermined weight of HSFC image luminance component. These global luminance components may for example be stored and obtainable from the memory 115 in a thermal imaging device 170. In one or more embodiments, the contribution of HSFC image luminance components in a contrast-enhanced image or image segment may be turned on or off dependent on the blending measure $B_m$.

In one or more embodiments, determining image luminance weights further comprises:
Determining the thermal image luminance weight $\alpha_1$ as:

$$\begin{cases} \beta_{IR}, & \text{for blending measure} = 1 \\ 1, & \text{for blending measure} < 1 \end{cases}$$

and determining the HSFC image luminance weight $\alpha_2$ as:

$$\begin{cases} \beta_{HSFC}, & \text{for blending measure} = 1 \\ 0, & \text{for blending measure} < 1 \end{cases}$$

For example, a contrast-enhanced image or image segment may be generated comprising a combined IR image luminance component and a HSFC image luminance component if the blending measure $B_m$ is equal to 1, e.g. when the IR imaging system is in focus. In another example, a contrast-enhanced image or image segment comprising only IR image luminance components is generated if the blending measure $B_m$ is <1, e.g. when the IR imaging system is out of focus or when there is not enough contrast variation in the visual light image.

The contrast variation may e.g. be determined by measuring the local contrast in small windows throughout the visual light image, where the contrast variation will be the variation of these local contrast values throughout the image. The contrast variation may e.g. be compared with a predetermined threshold, and if the contrast variation is lower than the predetermined threshold, the blending measure will indicate that there is not enough contrast variation in the visual light image. There are also other ways of determining the contrast variation according to embodiments, such as calculating the average value of the pixels in the visual light image. If the average value is extremely high or extremely low, the visual light image is too dark or too bright to provide useful information, because there is not enough contrast variation in the visual light image. It may alternatively or additionally be possible to use a sensor to measure the amount of light in the scene, and based on this measurement determine that the visual light image will be too dark or too bright to provide useful information, so that there will not be enough contrast variation in the visual light image.

In one or more embodiments of the disclosure the weight of IR image luminance component is determined by $\alpha_1$ in combination with a global luminance weight $\beta_{IR}$ and the weight of HSFC image luminance component is determined by $\alpha_2$ in combination with a global luminance weight $\beta_{HSFC}$. The global luminance weight $\beta_{IR}$ describing a predetermined weight of the thermal image luminance component and the global luminance weight $\beta_{HSFC}$ describe a predetermined weight of HSFC image luminance component, e.g. stored in and being obtainable from the memory 115 of a thermal imaging device 170.

In one or more embodiments, determining image luminance weights further comprises:
Determining the thermal image luminance weight $\alpha_1$ as:

$$\begin{cases} 1, & \text{for blending measure} = 1 \\ 1, & \text{for blending measure} < 1 \end{cases}$$

and the HSFC image luminance weight $\alpha_2$ is determined as:

$$\begin{cases} 1, & \text{for blending measure} = 1 \\ 0, & \text{for blending measure} < 1 \end{cases}$$

For example, a contrast-enhanced image or image segment is generated comprising a combined IR image luminance component and a HSFC image luminance component if the blending measure $B_m$ is equal to 1, e.g. when the IR imaging system is in focus. In yet an example, a contrast-enhanced image or image segment comprising only IR image luminance component is generated if the blending measure $B_m$ is <1, e.g. when the IR imaging system is out of focus or when there, is not enough contrast variation in the visual light image.

Determining Image Luminance Weights Proportional to Blending Measure

In one or more embodiments of the disclosure the weight of IR image luminance component is determined only by $\alpha_1$ and the weight of HSFC image luminance component is determined only by $\alpha_2$. A global luminance weight $\beta_{IR}$ describing a predetermined weight of the thermal image luminance component and a global luminance weight $\beta_{HSFC}$ describe a predetermined weight of HSFC image luminance component, e.g. being stored and obtainable from the memory 115 of a thermal imaging device 170. In one embodiment, the contribution of HSFC image luminance components in a contrast-enhanced image or image segment is proportional to the blending measure $B_m$.

In one or more embodiments, determining image luminance weights further comprises:
Generating a normalized blending measure $B_{m-normalized}$, i.e. such that the maximum blending measure $B_m$ is equal to 1 and the minimum blending measure $B_m$ is equal to 0.
Determining the thermal image luminance weight $\alpha_1$ as:

$$\begin{cases} \beta_{IR} * (1 - B_{m-normalized}), & \text{for blending measure} > 1 \\ 1, & \text{for blending measure} = 0 \end{cases}$$

and wherein the HSFC image luminance weight $\alpha_2$ is determined as:

$$\begin{cases} \beta_{HSFC} * B_{m-normalized}, & \text{for blending measure} > 1 \\ 0, & \text{for blending measure} = 0 \end{cases}$$

In one or more embodiments, determining image luminance weights further comprises:

Generating a normalized blending measure $B_{m\text{-}normalized}$, i.e. such that the maximum blending measure $B_m$ is equal to 1 and the minimum blending measure $B_m$ is equal to 0.

Determining the thermal image luminance weight $\alpha_1$ as:

$$\begin{cases} (1 - B_{m\text{-}normalized}), & \text{for blending measure} = 1 \\ 1, & \text{for blending measure} < 1 \end{cases}$$

and wherein the HSFC image luminance weight $\alpha_2$ is determined as:

$$\begin{cases} B_{m\text{-}normalized}, & \text{for blending measure} = 1 \\ 0, & \text{for blending measure} < 1 \end{cases}$$

Generating a Visual Representation

As infrared radiation is not visible to the human eye there are no natural relations between the data values of the pixels in a thermal image and the greyscale or the colors displayed on a display. Therefore, an information visualization process commonly referred to as false coloring or pseudo coloring is used to map image data values or pixel values of each pixel, e.g. in a thermal image, HSFC image or contrast-enhanced combined image, to a palette used to generate a visual representation and optionally present the image on a display, e.g. using grey-scale or colors.

A palette is typically a finite set of color or grey-scale representations selected from a color model for the display of images or visual representations of IR images/gas-absorption-path-length images, i.e. a pre-defined palette represents a finite set of grayscale or color values of a color model displayable on a display thereby making it visible to the human eye. Mapping of captured infrared (IR) image data values of each pixel in a thermal image or gas image data values of each pixel in an image to a palette used to present the corresponding pixel of a visual representation of said image displayed on a display is typically performed by applying a pre-determined relation. Such a pre-determined relation typically describes a mapping from image data values or pixel values to said pre-defined palette, e.g. a palette index value with an associated color or grey-scale representation selected from a color model. The image is typically displayed to an intended user based on the image data values or pixel values of each pixel in an image, optionally IR temperature calibration data parameters, a predefined palette representing a finite set of grayscale or color values of a color model displayable on a display and a pre-determined relation describing a mapping from infrared image data values or gas-absorption-path-length image pixel values to said pre-defined palette.

One or more embodiments of the disclosure may further comprise generating a visual representation based on pixel values in the contrast-enhanced combined image, and may optionally also comprise displaying the visual representation on a display 118 of a thermal imaging device.

Further Embodiments

When applicable, various embodiments provided by the present disclosure can be implemented using hardware, software, or combinations of hardware and software. Also where applicable, the various hardware components and/or software components set forth herein can be combined into composite components comprising software, hardware, and/or or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa. Where applicable, the ordering of various steps described herein can be changed, combined into composite steps, and/or separated into sub-steps to provide features described herein.

Software in accordance with the present disclosure, such as program code and/or data, can be stored in non-transitory form on one or more machine-readable mediums. It is also contemplated that software identified herein can be implemented using one or more general purpose or specific purpose computers and/or computer systems, networked and/or otherwise.

In embodiments, there are provided a computer program product comprising computer readable code configured to, when executed in a processor, perform any or all of the method steps described herein. In embodiments, there are provided a non-transitory computer readable memory on which is stored computer readable and computer executable code configured to, when executed in a processor, perform any or all of the method steps described herein.

Embodiments described herein illustrate but do not limit the invention. It should also be understood that numerous modifications and variations are possible in accordance with the principles of the invention. Accordingly, the scope of the invention is defined only by the following claims.

The invention claimed is:

1. A method comprising:
   receiving a thermal image and a visual light image of a scene;
   determining a blending measure indicating the quality of at least one of said thermal and visual light images, wherein the blending measure is based on an estimated distance to the scene from a thermal imaging system capturing the thermal image and/or a visual light imaging system capturing the visual light image and a focusing distance of the thermal imaging system and/or of the visual light imaging system;
   combining, based on the blending measure, luminance components of thermal image pixels from the thermal image with luminance components of visual light image pixels representing high spatial frequency content extracted from the visual light image; and
   generating a contrast-enhanced combined image based on the thermal image and the combined luminance components.

2. The method of claim 1, wherein the quality of an image is high when said image is focused and/or said image comprises edges, and wherein the quality of an image is low when said image is unfocused and/or said image lacks edges.

3. The method of claim 1, wherein the quality of the visual light image is determined based on contrast variation in the visual light image.

4. The method of claim 1, further comprising:
   determining luminance weights for said thermal image and for said visual light image based on the blending measure; and
   scaling the luminance components from the thermal image and the luminance components from the visual light image, respectively with said corresponding luminance weights;
   wherein the luminance weights are determined to scale the luminance components such that the contribution of luminance components representing high spatial frequency content of the visual light image is proportional to the blending measure.

5. The method of claim 1, wherein the blending measure is determined based further on at least one of:
an image sharpness relation dependent on a distance to the scene or to an object in the scene from the thermal imaging system and/or the visual light imaging system of a thermal imaging device capturing said images;
a parallax error relation dependent on a distance to the scene from the thermal imaging system and/or the visual light imaging system;
an edge measure indicating the presence of edges in the captured images of the scene and being dependent on the high spatial frequency content comprised in the visual light image; or
contrast variation in the visual light image.

6. The method of claim 1, further comprising:
dividing said thermal image into thermal image segments;
dividing said visual light image into visual light image segments; and
determining respective blending measures for said thermal and visual light image segments,
wherein the combining of the luminance components comprises combining luminance components of pixels from the respective thermal image segments with luminance components of pixels representing high spatial frequency content from the corresponding visual light image segments based on the corresponding blending measures, and
wherein the generating of the contrast-enhanced combined image comprises:
generating contrast-enhanced combined image segments based on the thermal image segments and the combined luminance components, and
generating the contrast-enhanced combined image comprising said contrast-enhanced combined image segments.

7. The method of claim 1, further comprising:
excluding the luminance components of pixels representing the high spatial frequency content of the visual light image dependent on the blending measure indicating that a thermal imaging system producing the thermal image is unfocused; and/or
excluding the luminance components of pixels representing the high spatial frequency content of the visual light image dependent on the blending measure indicating that there is not enough contrast variation in the visual light image.

8. A non-transitory machine-readable medium on which is stored machine-readable code which, when executed by a processor of a thermal imaging apparatus, causes the processor to perform the method of claim 1.

9. The method of claim 1, further comprising blurring, based on the blending measure, the high spatial frequency content of the visible light image to obtain a blurred visible light image, wherein the combining comprises combining the luminance components of the thermal image pixels from the thermal image with blurred luminance components of visual light image pixels from the blurred visible light image to obtain the combined luminance components.

10. The method of claim 1, wherein the blending measure is based on a ratio of the estimated distance and the focusing distance.

11. A thermal imaging apparatus comprising:
a thermal imaging system configured to capture a thermal image of a scene;
a visual light imaging system configured to capture a visual light image of the scene; and
a processor communicatively coupled to the thermal and visual light imaging systems, the processor configured to:
determine a blending measure indicating the quality of at least one of said thermal and visual light images, wherein the blending measure is based on an estimated distance to the scene from the thermal imaging system and/or the visual light imaging system and a focusing distance of the thermal imaging system and/or of the visual light imaging system;
combine, based on the blending measure, luminance components of thermal image pixels from the thermal image with luminance components of visual light image pixels representing high spatial frequency content extracted from the visual light image, and
generate a contrast-enhanced combined image based on the thermal image and the combined luminance components.

12. The thermal imaging apparatus of claim 11, wherein the quality of an image is high when said image is focused and/or said image comprises edges, and wherein the quality of an image is low when said image is unfocused and/or said image lacks edges.

13. The thermal imaging apparatus of claim 11, wherein the quality of the visual light image is low when there is not enough contrast variation in the visual light image.

14. The thermal imaging apparatus of claim 11, wherein the processor is further configured to:
determine luminance weights for said thermal image and for said visual light image based on the blending measure; and
scale the luminance components from the thermal image and the luminance components from the visual light image, respectively with said corresponding luminance weights;
wherein the luminance weights are determined to scale the luminance components such that the contribution of luminance components representing high spatial frequency content of the visual light image is proportional to the blending measure.

15. The thermal imaging apparatus of claim 11, wherein the blending measure is determined based further on at least one of:
an image sharpness relation dependent on a distance to the scene or to an object in the scene from the thermal imaging system and/or the visual light imaging system;
a parallax error relation dependent on a distance to the scene from the thermal imaging system and/or the visual light imaging system;
an edge measure indicating the presence of edges in the captured images of the scene and being dependent on the high spatial frequency content comprised in the visual light image; or
contrast variation in the visual light image.

16. The thermal imaging apparatus of claim 11, wherein the processor is further configured to blur the high spatial frequency content represented in the contrast-enhanced combined image in response to the blending measure indicating that the thermal image is unfocused.

17. The thermal imaging apparatus of claim 11, wherein the processor is further configured to:
divide said thermal image into thermal image segments;
divide said visual light image into visual light image segments;

determine respective blending measures for said thermal and visual light image segments;

combine the luminance components of the thermal image pixels and the visual light image pixels by combining luminance components of pixels from the respective thermal image segments with luminance components of pixels representing high spatial frequency content from the corresponding visual light image segments based on the corresponding blending measures; and generate the contrast-enhanced combined image by:
  generating contrast-enhanced combined image segments based on the thermal image segments and the combined luminance components, and
  generating the contrast-enhanced combined image comprising said contrast-enhanced combined image segments.

18. The thermal imaging apparatus of claim 11, wherein the processor is further configured to exclude the luminance components of pixels representing the high spatial frequency content of the visual light image dependent on the blending measure indicating that the thermal imaging system producing the thermal image is unfocused.

19. The thermal imaging apparatus of claim 11, wherein the processor is further configured to exclude the luminance components of pixels representing the high spatial frequency content of the visual light image dependent on the blending measure indicating that there is not enough contrast variation in the visual light image.

20. A method comprising:
  receiving a thermal image and a visual light image of a scene;
  determining a blending measure indicating the quality of at least one of said thermal and visual light images;
  combining, based on the blending measure, luminance components of thermal image pixels from the thermal image with luminance components of visual light image pixels representing high spatial frequency content extracted from the visual light image;
  generating a contrast-enhanced combined image based on the thermal image and the combined luminance components; and
  blurring the high spatial frequency content represented in the contrast-enhanced combined image in response to the blending measure indicating that the thermal image is unfocused.

* * * * *